US007020084B1

(12) United States Patent
Tanaka et al.

(10) Patent No.: US 7,020,084 B1
(45) Date of Patent: Mar. 28, 2006

(54) COMMUNICATION SYSTEM, A COMMUNICATION METHOD AND COMMUNICATION TERMINAL

(75) Inventors: Koji Tanaka, Yokohama (JP); Masahiro Hayashi, Yokohama (JP); Koji Hirayama, Yokohama (JP); Haruo Shibata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 950 days.

(21) Appl. No.: 09/642,013

(22) Filed: Aug. 21, 2000

(30) Foreign Application Priority Data

Apr. 25, 2000 (JP) ............................ 2000-128957

(51) Int. Cl.
*H04L 12/56* (2006.01)
*G06F 15/16* (2006.01)

(52) U.S. Cl. ................. 370/235; 370/395.41; 370/399; 709/203; 709/227

(58) Field of Classification Search ................ 370/397, 370/399, 395.1, 477, 464, 230, 230.1, 235, 370/338, 349, 389, 395.4, 395.41, 401, 409, 370/522, 468; 709/201, 203, 223, 224, 226, 709/227, 229, 230, 238, 249
See application file for complete search history.

(56) References Cited

U.S. PATENT DOCUMENTS

| | | | | | |
|---|---|---|---|---|---|
| 5,420,859 | A | * | 5/1995 | Takase et al. ................ | 370/397 |
| 5,943,339 | A | * | 8/1999 | Mauger ....................... | 370/397 |
| 5,953,338 | A | * | 9/1999 | Ma et al. ................. | 370/395.21 |
| 6,091,727 | A | * | 7/2000 | Han et al. ............... | 370/395.21 |
| 6,094,437 | A | * | 7/2000 | Loehndorf et al. ......... | 370/420 |
| 6,452,915 | B1 | * | 9/2002 | Jorgensen .................... | 370/338 |
| 6,463,475 | B1 | * | 10/2002 | Calhoun ..................... | 709/227 |
| 6,480,888 | B1 | * | 11/2002 | Pedersen ..................... | 709/218 |
| 6,507,577 | B1 | * | 1/2003 | Mauger et al. ............. | 370/356 |
| 6,587,880 | B1 | * | 7/2003 | Saigo et al. ................. | 709/225 |
| 6,590,885 | B1 | * | 7/2003 | Jorgensen .................... | 370/338 |
| 6,594,246 | B1 | * | 7/2003 | Jorgensen .................... | 370/338 |
| 6,614,809 | B1 | * | 9/2003 | Verma et al. ............... | 370/469 |
| 6,628,629 | B1 | * | 9/2003 | Jorgensen .................... | 370/322 |
| 6,654,808 | B1 | * | 11/2003 | Chuah ........................ | 709/227 |
| 6,704,282 | B1 | * | 3/2004 | Sun et al. ................... | 370/237 |
| 6,754,831 | B1 | * | 6/2004 | Brownell ...................... | 726/15 |

* cited by examiner

*Primary Examiner*—Alpus H. Hsu
(74) *Attorney, Agent, or Firm*—Mattingly, Stanger, Malur & Brundidge, P.C.

(57) ABSTRACT

A service of reducing the number of tunnels in exchange for a specified service fee. A communication system, which generates tunnels in physical lines and multiplexes a plurality of sessions on the physical lines, comprises a monitor unit for monitoring the state of use of tunnels and sessions used by the user when the user using a plurality of tunnels is a customer who requires service of reserving sessions in a smaller number of tunnels in exchange for a specified service fee; a tunnel/session control unit performs control so as to gather the plurality of sessions of said user in a specified tunnel when the sessions currently used by the user can be reserved in a smaller number of tunnels; and a charging unit for charging a usage rate according to the number of tunnels or the number of physical lines used.

16 Claims, 25 Drawing Sheets

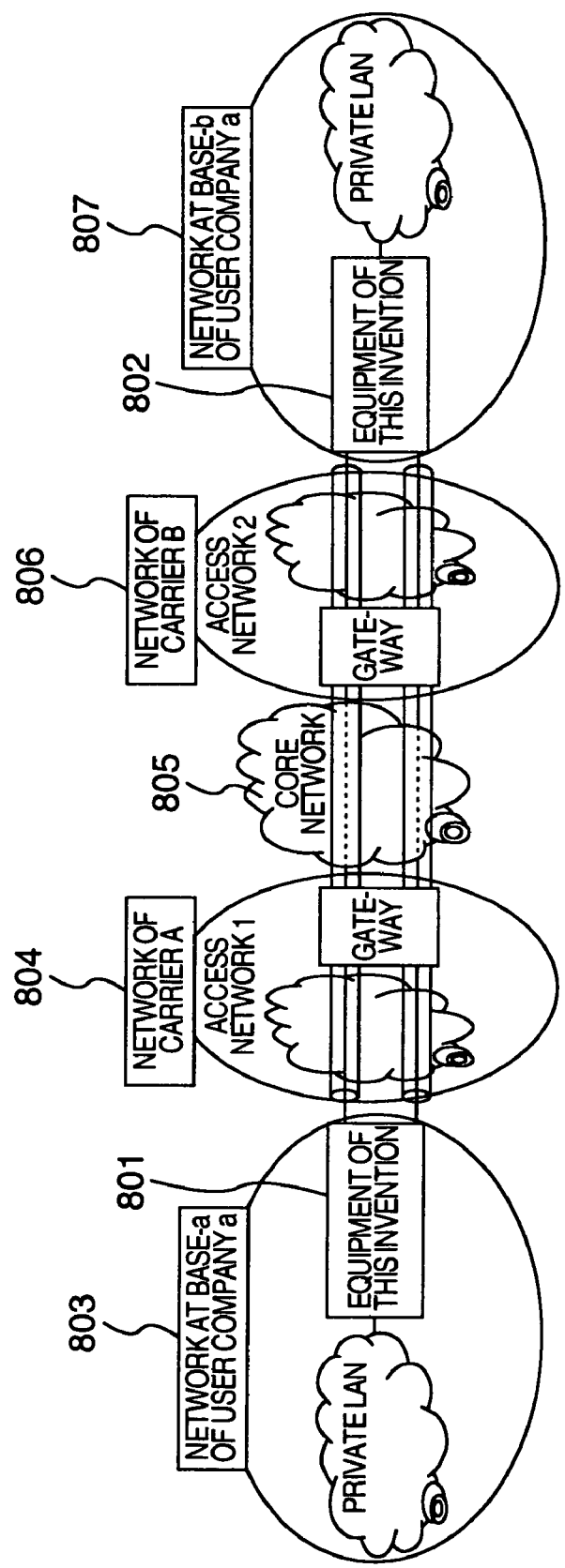

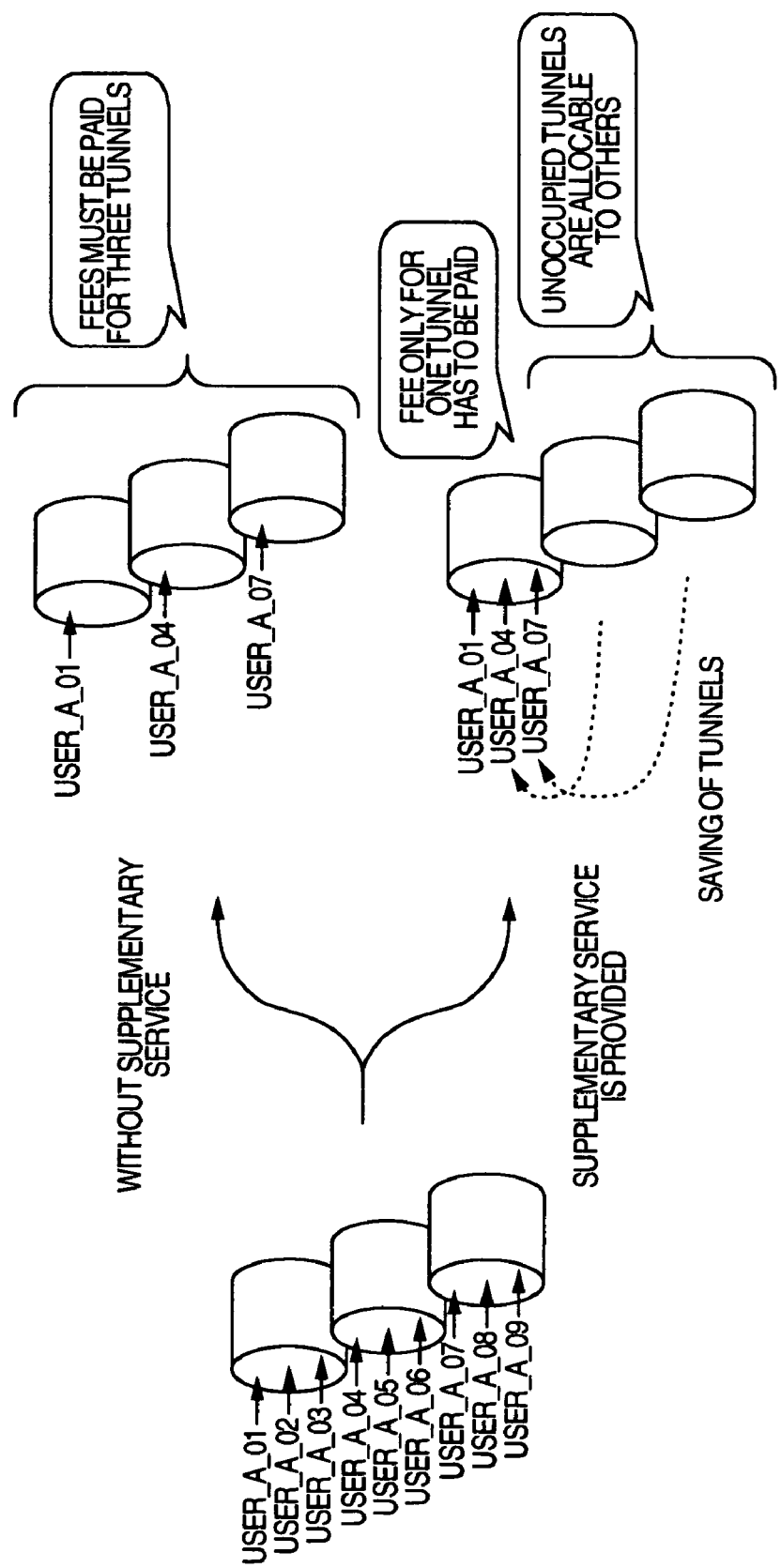

FIG.25

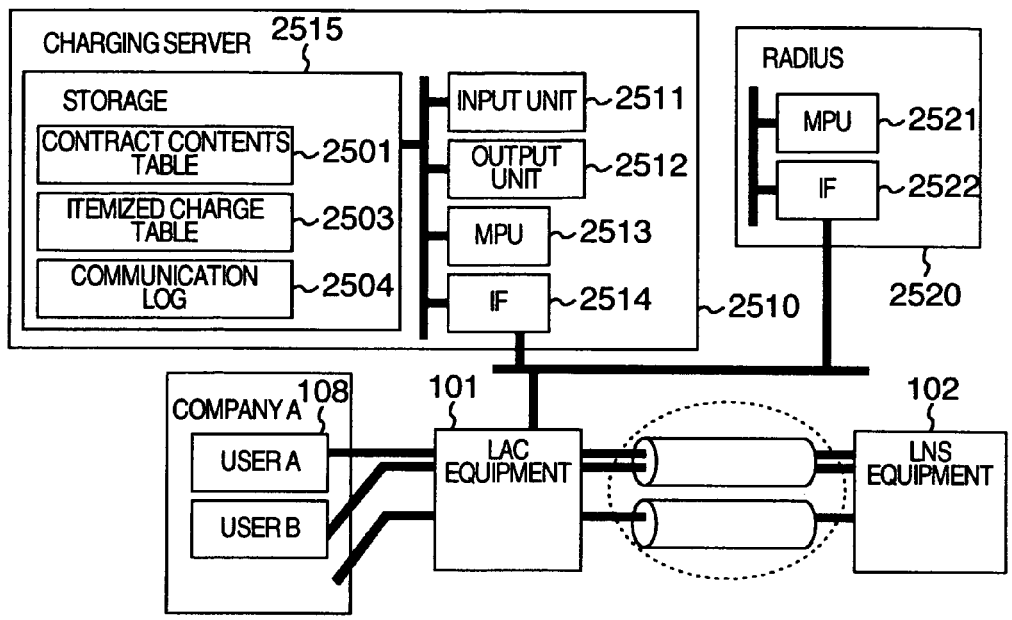

CONTRACT CONTENTS TABLE

| CONTRACTOR | BANK ACCOUNT FOR PAYMENT | SUPPLEMENTARY SERVICE | ~2501 |
|---|---|---|---|
| COMPANY A | BANK H XX-XXXXX | 1 | |
| COMPANY B | BANK E XX-XXXXX | 0 | |
| — | — | — | |

USER ADMIN. TABLE

| USER ID | PASSWORD | SERVICE LEVEL | CONTRACTOR | ~2502 |
|---|---|---|---|---|
| USER_A_01 | 1212 | 1 | COMPANY A | |
| USER_A_02 | 2323 | 2 | COMPANY A | |
| — | — | — | — | |
| USER_B_01 | 4545 | 0 | COMPANY B | |

ITEMIZED CHARGE TABLE

| CONTRACTOR | BASIC CHARGE | SUBCHARGE | COMM. CHARGE | TOTAL | ~2503 |
|---|---|---|---|---|---|
| COMPANY A | Fa | P | Ca | Ta | |
| COMPANY B | Fb | 0 | Cb | Tb | |
| — | — | — | — | — | |

COMMUNICATION LOG 2504

| COMM. START DATE-TIME | COMM. TIME | SERVICE LEVEL | USER ID | COMM. FEE | TUNNEL USED |
|---|---|---|---|---|---|
| 20000105100000 | 10 | 1 | USER_A_01 | 100 | Tunnel_01 |
| 20000105100000 | 02 | 2 | USER_A_02 | 20 | Tunnel_02 |
| 20000105100003 | 08 | 2 | USER_A_02 | 0 | Tunnel_01 |

COMMUNICATION SYSTEM, A COMMUNICATION METHOD AND COMMUNICATION TERMINAL

BACKGROUND OF THE INVENTION

The present invention relates to a tunnel administration technique used when a remote terminal connects through a tunnel to the server in a remote access network.

Efforts are continuing to develop a form of connection for a remote terminal of a business corporation to access the server of its own corporation through connection service by a Internet Service Provider (ISP). This access method, though it requires the use of a network built by another company, enables the business firm to use the network in the same way as it uses its own network, and therefore it is called a Virtual Private Network (VPN). A form of connection by which to connect LANs of branch offices through the Internet is a typical example of the VPN.

Tunneling is one of techniques for building a VPN. Tunneling is a technique that uses an intermediate network as a tunnel. When data based on a certain protocol is carried by an intermediate network, it is encapsulated beforehand so as not to have to worry about dealing with another network of a different protocol and when the data gets out of the intermediate network, the data is decapsulated and sent on another network of the same protocol as the network it started its journey on. For example, if a Wide Area Network (WAN) on which a VPN is built is the Internet, an IP (Internet Protocol) packet is encapsulated by adding an IP header to it to pass through the WAN.

As tunneling protocols, L2TP (Layer 2 Tunneling Protocol), PPTP (Point-to-Point Tunneling Protocol) and L2F (Layer-2 Forwarding) are well known.

In recent years, mobile computing by a portable telephone or a wireless LAN has been used widely, and the subscribers are on a steady increase. With scarcity of IPv4 (Internet Protocol version 4) addresses, it has become a general trend to use private addresses in the IP network within the firm (a private LAN). For this reason, in order to access a private LAN from a mobile terminal, it is necessary to build a so-called VPN of a structure such that a tunneling function is provided at the outlet (gateway) of a mobile communications network and at the access server of a private LAN and thus it appears as if those two points were connected by a private line through the networks between them.

However, the tunneling protocol used in the VPN specifies only a method for forming a tunnel and so on, but it does not provide any detailed specification for communication line control.

SUMMARY OF THE INVENTION

The present invention makes it possible to switch a tunnel from a current communication line to another suitable line according to the contracted service level or the traffic density on the user side to thereby reduce the number of communication lines on which tunnels are formed.

VPN equipment on either side of the tunnel is provided with a function to switch over a tunnel established on one communication line to a tunnel on another line or one of a plurality of lines, another function to administer the state of the tunnel according to an administration table, and a bandwidth control function to control the traffic density of the respective tunnels, making it possible to implement dynamic control of the tunnels.

BRIEF DESCRIPTION OF THE DRAWINGS

FIG. 23 shows an example in which the tunnel controllers are applied;

FIG. 24 shows a business model of the present invention in the present patent application; and FIG. 25 shows a system configuration for realizing the business model.

DESCRIPTION OF THE EMBODIMENT

As an embodiment of the present invention, a case where L2TP is used as the tunneling protocol will be described. Note that the following embodiment is for purpose of illustration only and the present invention can be similarly applied to other tunneling protocols, such as PPTP, L2F and so on.

(1) Hardware

As the tunnel controllers, LAC 101 and LNS 102 are provided. Generally, LAC (L2TP Access Concentrator) establishes PPP connection with a dial-in client, sends a tunnel formation request to LNS (L2TP Network Server), and encapsulates all data to be sent from the client to the LNS and transfers encapsulated data to the LNS. The LAC decapsulates data received from the established tunnel and transfers the data to the client, and, when the client is going to release the connection, sends a tunnel-disconnect request to the LNS.

Figure 1:
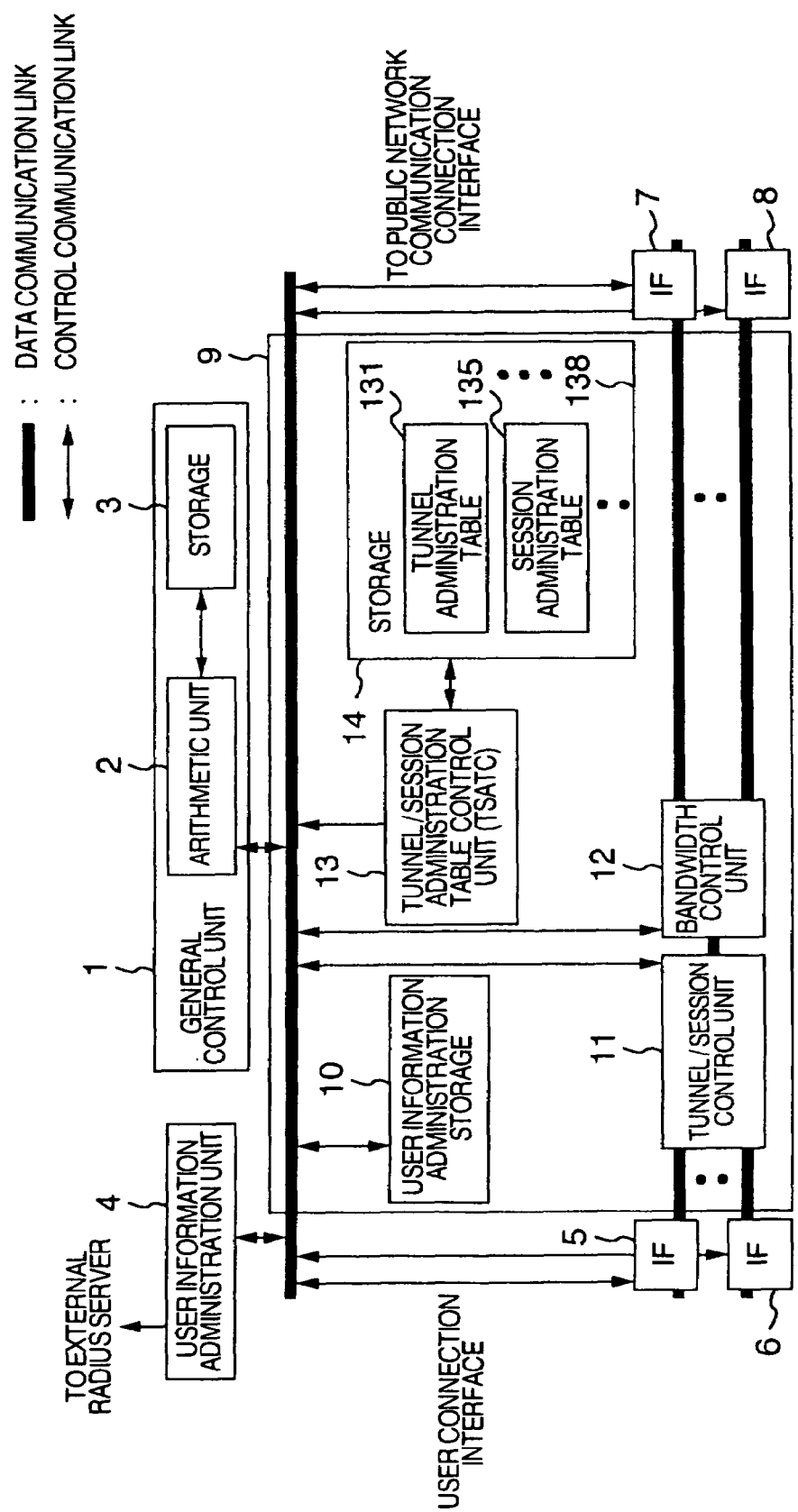
FIG. 1 shows an example of configuration of the tunnel controller on a remote user side.

FIG. 1 is a block diagram of the LAC 101, which is a tunnel controller. A general control unit 1, which is the main control unit of the tunnel controller, includes an arithmetic unit 2 and a storage 3. A user information administration unit 4 administrates remote user authentication or the like. User connection interfaces 5, 6 are used to connect to remote users.

Public network connection interfaces 7, 8 are used to connect to networks, such as the Internet. L2TP processor 9 performs processing of this embodiment in addition to ordinary processing of L2TP protocol. A user information administration/storage unit 10 administers the users connected to VPN and stores user information. A Tunnel/Session Control Unit (TSC) 11 forms and disconnects the tunnels and administers the tunnels and sessions. A bandwidth control unit 12 includes a Tunnel/Session Administration Table Control Unit (TSATC) 13 to administer the tunnels and sessions, which are logic paths along the communication lines and a storage 14. In Figures, the thick lines indicate data communication links and the thin lines indicate control communication links. The user information administration unit 4 includes a charging unit for charging the usage rate according to the number of tunnels or the number of physical lines used. The charging unit is not required to be installed in the LAC, but may be mounted in another server on the network.

On the other hand, in response to the tunnel formation request from LAC, the LSN decapsulates all data received from the established tunnel, transfers data to a private network or terminates the tunnel by request from the LAC or at the expiration of the time of use.

Figure 2:
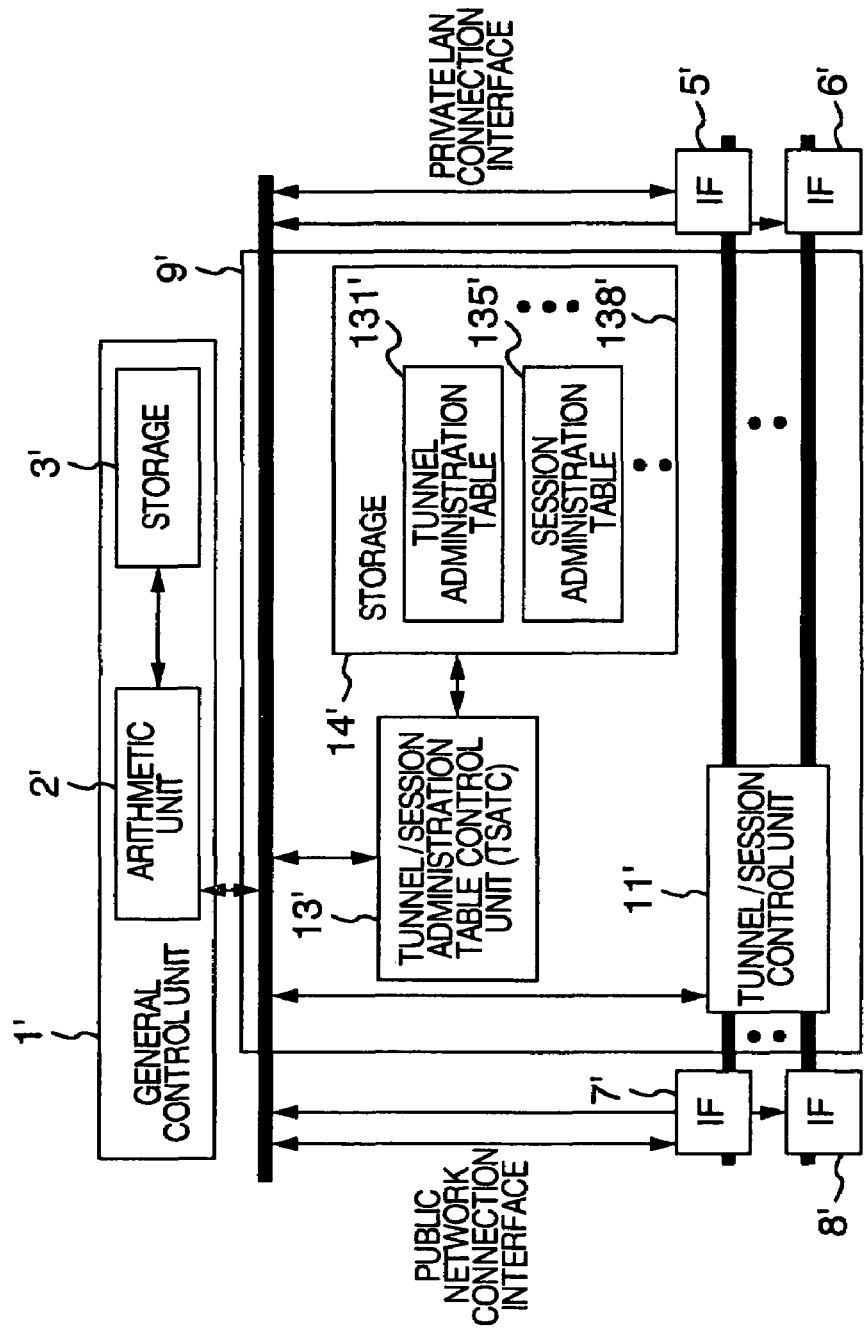
FIG. 2 shows an example of configuration of the tunnel controller on the LAN side.

FIG. 2 is a block diagram of LNS 102. The LSN 102 includes a general control unit 1', private LAN connection interfaces 5', 6', public network connection interfaces 7', 8', and an L2TP processor 9'.

The general control unit 1' includes an arithmetic unit 2' and a storage 3'. The L2TP processor 9' includes a TSC 11', TSATC 13' and a storage 14'.

Data having arrived via interfaces and not involved in tunneling (such as IP packets not encapsulated) is sent to the general control unit 1 (1'), processed by the arithmetic unit 2 (2') that has read a control program from the storage 3 (3'), and then sent to a suitable interface.

Figure 3:
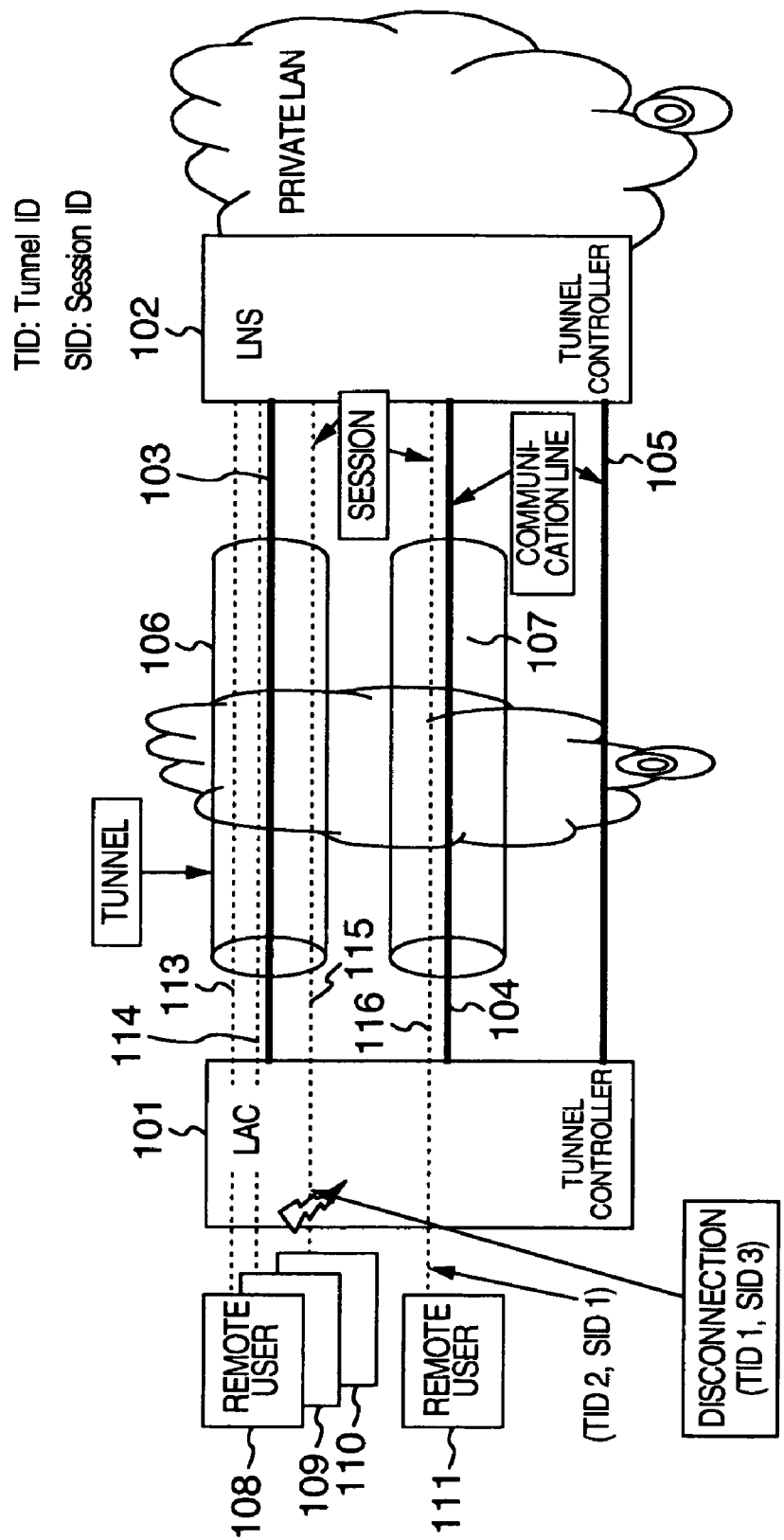
FIG. 3 shows a network configuration to which a first tunnel control method is applied.
Figure 4:
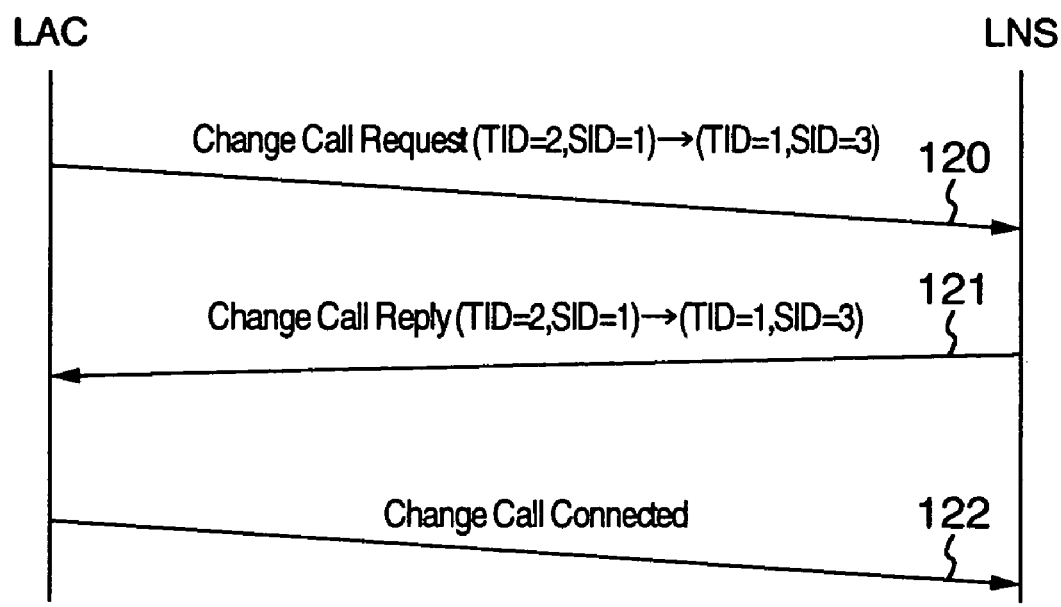
FIG. 4 shows a signal sequence of the first tunnel control method.
Figure 5:
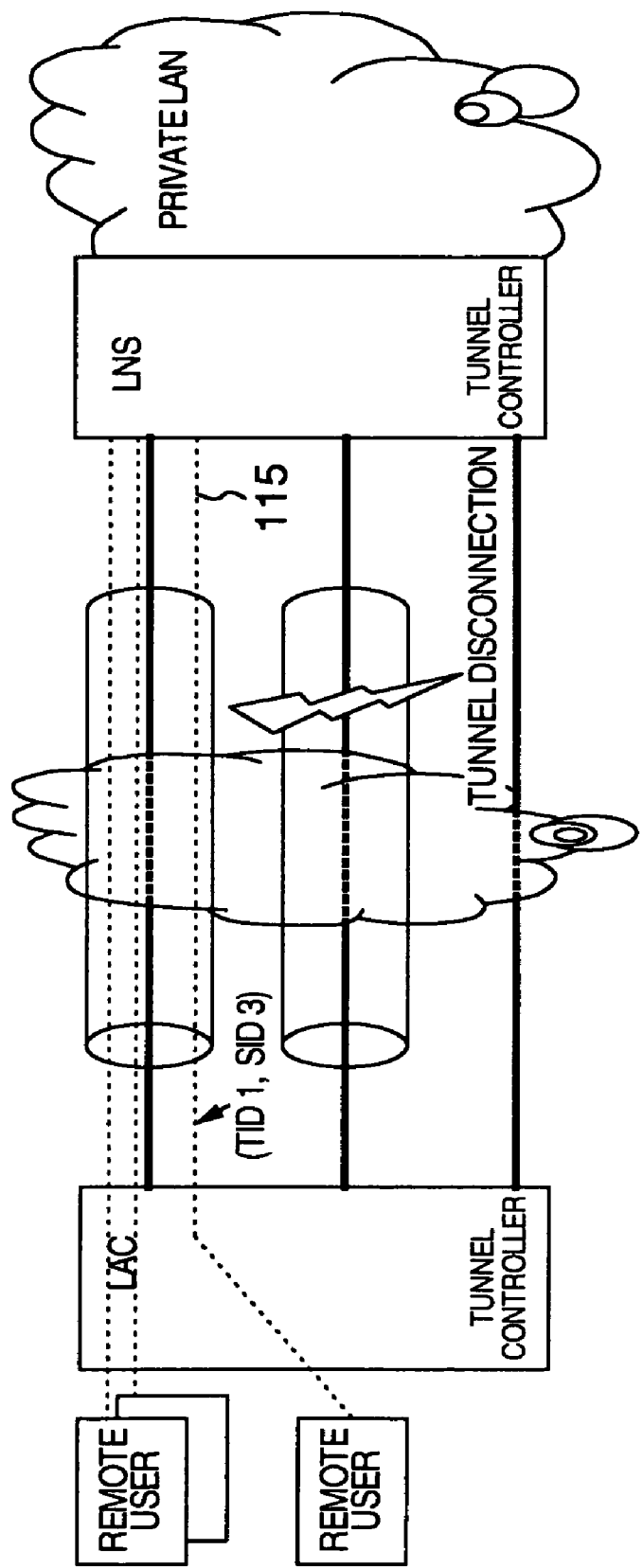
FIG. 5 shows the state after the first tunnel control method has been used.

(2) First Tunnel Control Method Not Taking SL (service level) into Consideration FIGS. 3 to 5 show examples of tunnel control by means of tunnel controllers (LAC 101, LSN 102) according to the present invention. FIG. 2 shows a case where a plurality of remote users are communicating data with a private LAN through the L2TP tunnels established on a plurality of communication lines connecting the tunnel controllers LAC 101 and LNS 102.

The public-network-side line connection interfaces 7, 8 of the LAC 101 are interconnected with the public-network-side line connection interfaces 7',8' of the LNS 102 via physical lines 103, 104 and 105. A tunnel 106 with a tunnel ID 1 is established on the physical line 103. A tunnel 107 with a tunnel ID 2 is established on the physical line 104. In L2TP, a plurality of sessions are multiplexed in this tunnel, and one session is reserved to each remote user. Individual sessions can be identified uniquely by a set of a tunnel ID assigned to the tunnel and a session ID assigned to the session. In this example, one tunnel is established in one communication line and a maximum of three sessions can be multiplexed in every tunnel.

In the tunnel 106, communication is established by session 113 of session ID 1 for a remote user 108, by session 114 of session ID 2 for a remote user 109, and by session 115 of session ID 3 for a remote user 110. In the tunnel 106, because three sessions have been established, there is no space for superposing any more session in the tunnel 106 (communication line 103). In the tunnel 107, a remote user 111 has communication established through session 116 of session ID 1. It is assumed here that since the communication line 105 is not used in this instance, a communication fee does not occur for the line 105.

Suppose that under the condition shown in FIG. 3, the remote user 110 finished communication and the session 115 was disconnected. The L2TP processor 9 of LAC 101, on detecting the disconnection of the session 115, generates a request control message (Change Call Request) to switch the session 116 over to the tunnel and the session ID that the session 115 used, and sends the message to the LNS 102 (120). Note that this message is transmitted to the LNS 102 from the public-network-side line connection interface 7 of LAC 101.

When this request control message is received by the public-network-side line connection interface of LNS 102, L2TP processor 9' of LNS 102 analyzes the content of the received message and the session administration table under its control and decides whether it is possible to switch over from one session to another, and to give a session-switchover permission, generates a reply control message (Change Call Reply), and returns the reply message to LAC 101 (121). Note that messages are exchanged between LNS 102 and LAC 101 through the line connection interfaces also in the following descriptions, but this is not described for simplicity's sake.

The LAC 101, after executing session switchover, generates a switchover complete control message (Change Call Connected), sends it to LNS 102, thus completing session switchover (122). After this, TSCs 11, 11' disconnect the tunnel 107 now without a session, the state of which is shown in FIG. 5. By this operation, the system enters a state that the minimum necessary communication lines are used without using the line 104, so that it is possible to make effective use of the communication lines.

For example, when the telecommunication carriers charge on the basis of a fee per communication line, not per session or per tunnel, if a larger number of sessions can be reserved in a fewer communication lines, communication expenses will become smaller for the users.

When ICQR, ICRP, ICCN (OCRQ, OCRP, OCCN) specified in L2TP are used as the session switch-over control messages transmitted between LAC 101 and LNS 102, it is necessary to define a new Attribute Value Pair, a tunnel ID and a session ID, to which a certain session is to be switched and transferred between LAC and LNS. L2TP provides that all commands should be expressed by a pair of an attribute type and a particular attribute value by taking interconnectability and expandability into consideration. This way of expression is referred to as AVP mentioned above. An AVP is stored or attached to a control message and transferred between LAC and LNS.

ICRQ, ICCN and OCRP are messages from LAC to LNS. More specifically, ICRQ stands for an Incoming-Call-Request, ICCN is a reply to ICRP and stands for Incoming-Call-Connected, and OCRP is a reply to OCRQ and stands for Outcoming-Call-Reply.

On the other hand, ICRP, OCRQ, and OCCN are messages from LNS to IAC. ICRP is a reply to ICRQ and stands for Incoming-Call-Reply, OCRQ stands for Outcoming-Call-Request, and OCCN is a reply to OCRP and stands for Outcoming-Call-Connected.

When LAC or LNS that does not support the session switchover function receives ICRQ during communication underway, there is a possibility that this message is taken as an error and the session 116 is disconnected.

To prevent a disconnection such as this, in the present embodiment, new control messages for a session switchover are defined. In FIG. 4, three control messages for session switchover, Change Call Request (CCRQ), Change Call Reply (CCRP) and Change Call Connected (CCCN), are defined anew and also an AVP of a tunnel ID and a session ID, to which a certain session is switched, is defined.

Figure 6:
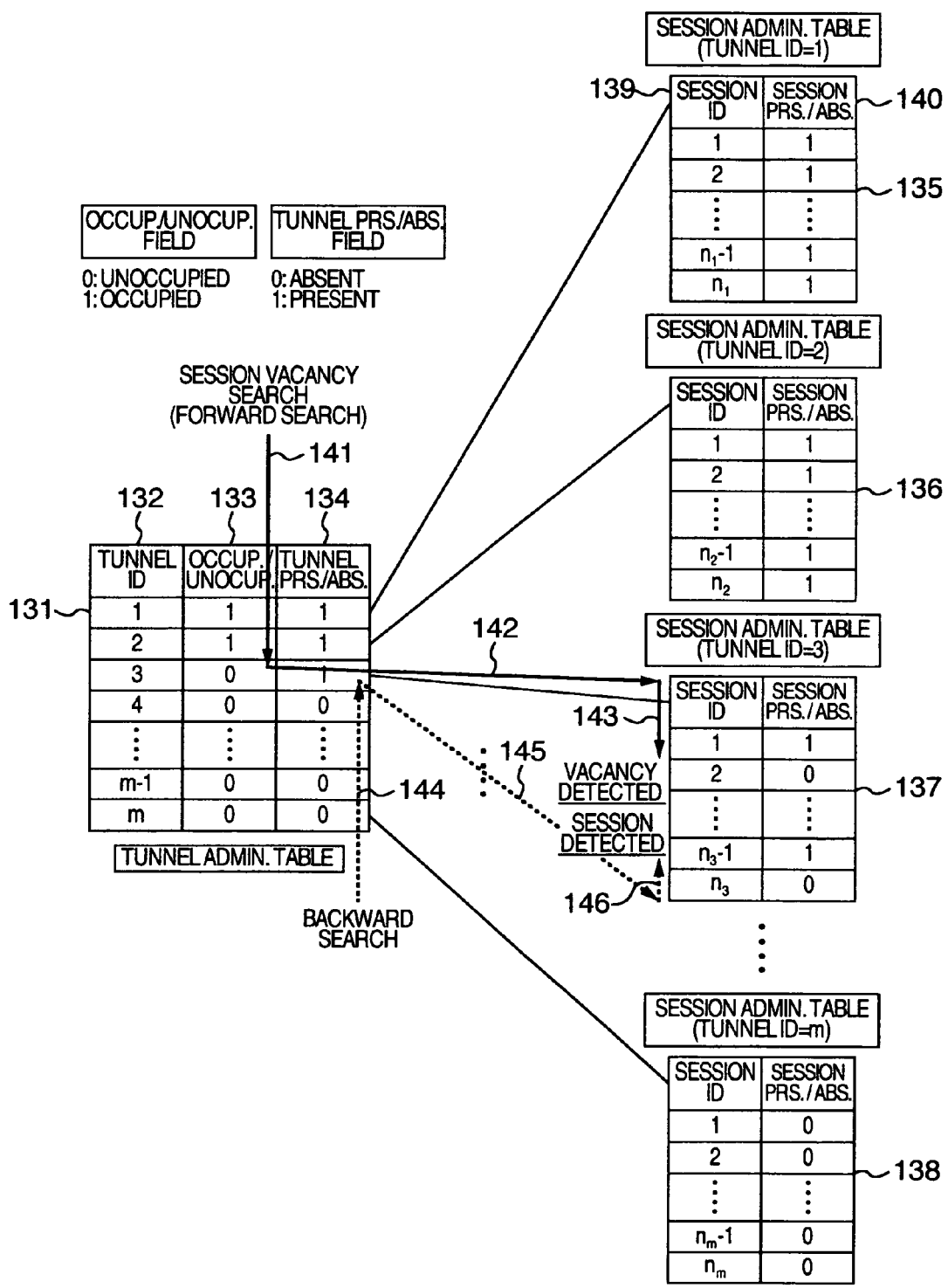
FIG. 6 shows an example of configuration of a tunnel/session administration tables.

TSATC 13(13') administers information about tunnels and sessions according to a tunnel administration table 131 and session administration tables 135–138 (135'~138'), which are generated by the TSATC and stored in storage units 14 (14'). FIG. 6 shows examples of the tunnel administration table and session administration tables in a case where LAC 101 and LNS 102 are interconnected by m communication lines and nk sessions can be multiplexed in a tunnel with a tunnel ID k. As information about each tunnel, the tunnel administration table 131 includes a tunnel ID field 132, an occupied/unoccupied field 133, and a tunnel presence/absence field 134. The tunnel ID field 132 corresponds to a tunnel ID of one tunnel that is actually established. The occupied/unoccupied field 133 indicates whether or not there is space for adding a new session in the tunnel, 0 represents that the tunnel is unoccupied and 1 represents that the tunnel is occupied. The tunnel presence/absence field 134 indicates whether a tunnel has been established or not, 1 represents the presence of a tunnel, and 0 represents that a tunnel has not been established.

There are m pieces of session administration tables 135 to 138, which correspond to m tunnels. Each table shows how sessions are multiplexed in a given tunnel. For information about each session, there are the session ID field 139 and the session presence/absence field 140. The session ID field 139 corresponds to the session ID of each of the sessions established by being multiplexed in one tunnel. The session presence/absence field 140 indicates whether or not the session of a session ID has been established, that is, 1 represents the presence of the session and 0 represents that the session has not been established.

Figure 7:
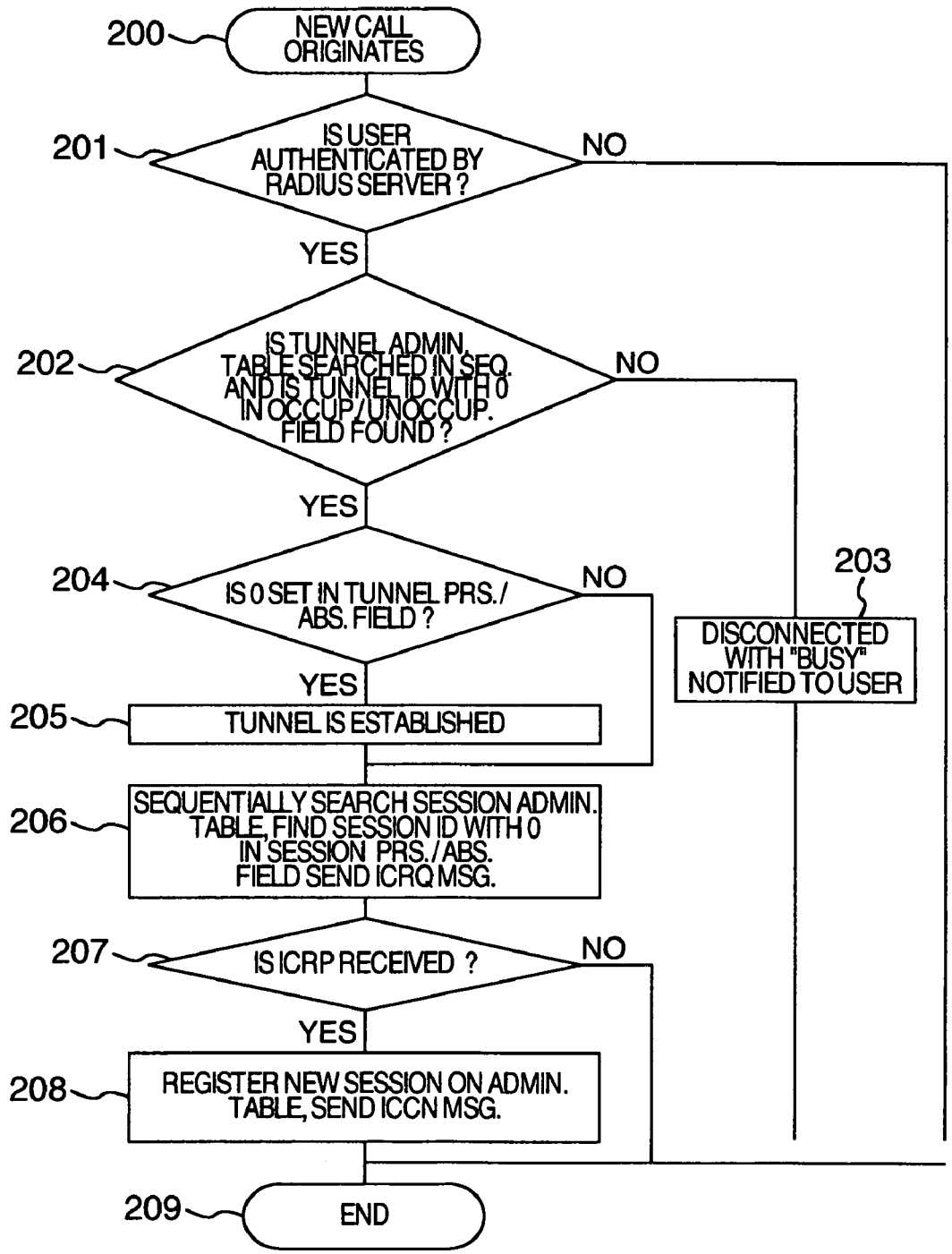
FIG. 7 shows an example of a flowchart for establishing a new session.

FIG. 7 is a flowchart of the operations in LAC 101 when a call originates from a user and a new session is established, a case which is based on the idea that sessions are to be gathered to the tunnels with smaller tunnel IDs insofar as possible.

When a user initiates a call and the call enters the user-side line connection interface 5 or 6 of LAC 101, the general control unit 1 of LAC 101 detects the originating call (200). Subsequently, the general control unit 1 issues a command to the user information administration unit 4 directing it to authenticate the user. In response to this command, the user information administration unit 4 executes the user authentication by RADIUS (remote authentication dial in user service) (201). Note that RADIUS is a protocol for authentication, approval and transfer of setting information for linkage with a network access server (NAS). The RADIUS server receives user information sent from a NAS client, authenticates user data, and returns necessary information to the NAS side. Password information, which is authenticated and transferred between the RADIUS server and the NAS client by information sharing, is encrypted for security.

Here, it is possible to make an arrangement to authenticate the user by checking if the user is a customer who requires service of reserving sessions in a fewer tunnels in exchange for a specified service fee. As a result of authentication, for those users of particular services, it is possible to put together a number of sessions of such a user in a specific tunnel. The users may be individual persons or business corporations. From a viewpoint of VPN connection, the employees of a business firm may be called the users. From a viewpoint of charging the fees, the business firms may be called users but also may be called groups of users.

The L2TP processor 9 is in charge of the tunnel control process after the completion of authentication. On receiving an authentication complete message from the user information administration unit 4, TSC 11 searches the tunnel administration table 131 through TSATC 13. Wen detecting a tunnel (141, 202) without session, TSC 11 decides whether or not the tunnel has been established (204). If not, it is necessary to form a tunnel on the corresponding communication line, so that TSC 11 sends a SCCRQ to LNS 102.

The TSC 11' of LNS 102, which received the SCCRQ message, transmits a tunnel reserve command to TSATC 13'. This tunnel reserve command directs that 1 should be written in the occupied/unoccupied field 133' on the tunnel administration table 131' for the tunnel corresponding to the communication line through which the SCCRQ was received. In response to this command, TSATC 13' rewrites the tunnel administration table 131'. After this, TSC 11' transmits a SCCRP message to LAC 101.

The TSC 11 of LAC 101 that received the SCCRP directs TSATC 13 to write 1 in the occupied/unoccupied field 133 on the tunnel administration table 131 of the tunnel corresponding to the communication line through which the SCCRP was received. TSATC 13, obeying this command, rewrites the tunnel administration table 131. Subsequently, TSC 11 transmits a SCCCN message to LNS 102 to establish the tunnel (205).

Those control messages mentioned above are used to establish a LAC-LNS control connection specified in RFC266. SCCRQ represents Start-Control-Connection-Request, SCCRP is a reply to SCCRQ and represents Start-Control-Connection-Reply, and SCCCN represents Start-Control-Connection-Connected to have a control connection established.

Then, TSC 11 directs TSATC 13 to sequentially search the session administration table of the tunnel ID, which was detected at Step 202, to find a session ID not currently used. In response to this command, TSATC 13 searches the session administration table of the storage 14 for an unused session ID (143), and returns a detected unused session ID to TSC 11. TSC 11 transmits to LNS 102 on the opposite side, an ICRQ message that specifies the session ID of an unused session in an Assigned Session ID AVP added to the message. The Assigned Session ID AVP is an AVP to show a session ID for use in communication (206).

The TSC 11 of LNS 102 that received the ICRQ message directs TSATC 13' to access the session administration table of the tunnel through which the ICRQ message was received and write 1 in the session presence/absence field of the session specified by the Assigned Session ID AVP in the ICRQ message. By abiding by this command, TSATC 13' rewrites the session administration table in the storage 14'.

After this, TSC 11' transmits an ICRP message to LAC 101. At this time, the Assigned Session ID AVP, which is attached to the ICRP message, carries the same session ID as specified by LAC 101.

The TSC 11 of LAC 101 that received the ICRP message (207) directs TSATC 13 to write 1 in the session presence/absence field of the session ID detected at Step 143. In response to this command, TSATC 13 rewrites the session administration table in the storage 14, and TSC 11 transmits an ICCN message to LNS 102 to establish the session (208). After completing the above steps, TSC 11 terminates its processing (209).

Figure 8:
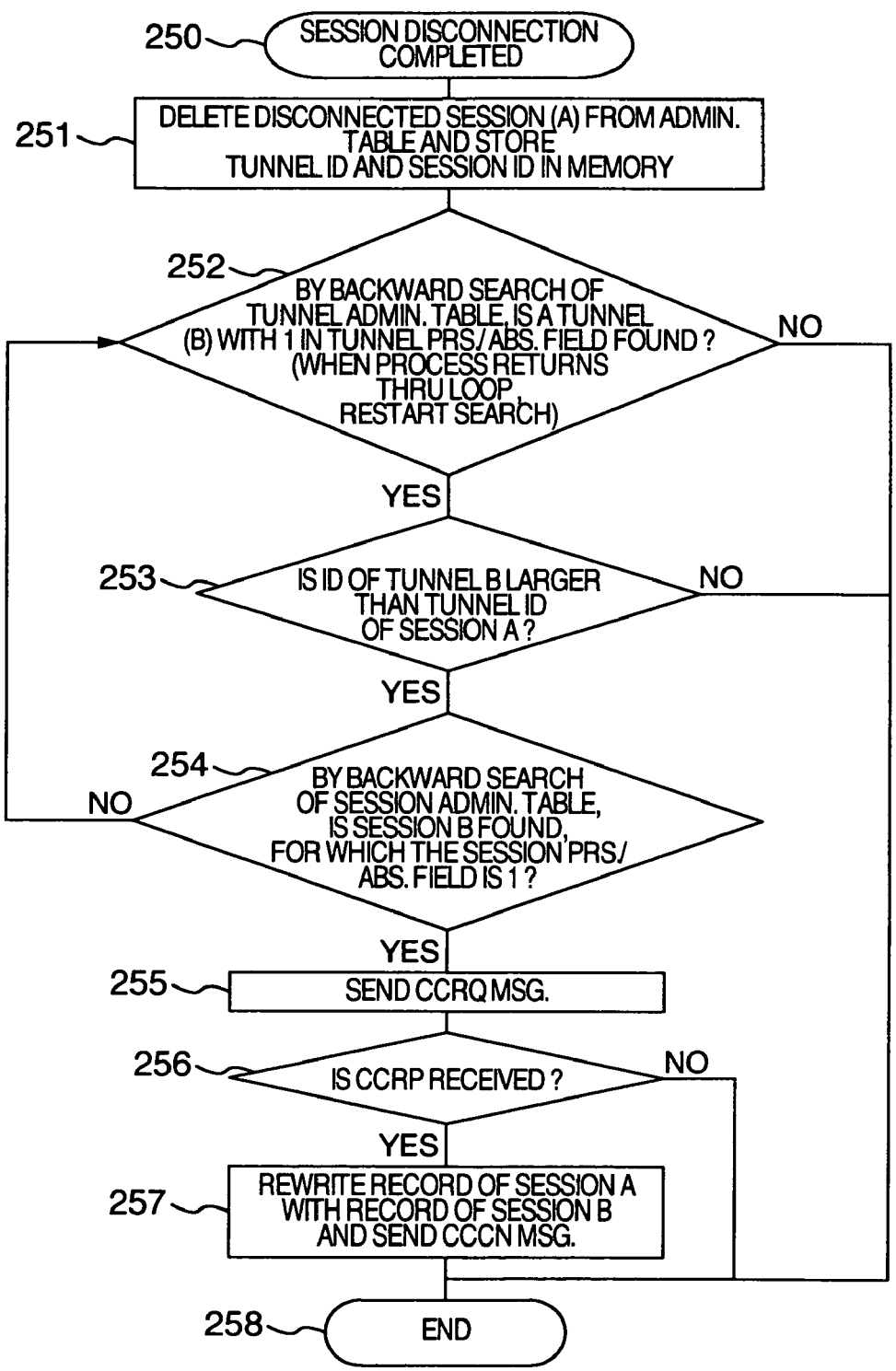
FIG. 8 shows an example of a flowchart when the session was disconnected.

FIG. 8 is a flowchart of LAC 101 when a session is disconnected. On detecting the disconnection of a session (250), TSC 11 directs TSATC 13 to write 0 in the session presence/absence field regarding session A in the session administration table.

In response to this command, TSATC 13 writes 0 in the session presence/absence field regarding the session A in the storage 14 (251). Similarly, in LNS 102, when detecting a disconnection of session A, TSC 11' asks TSATC 13' to write 0 in the session presence/absence field regarding session A in the session administration table. In response to this command, TSATC 13' writes 0 in the session presence/absence field regarding the session A in the storage 14'. With which the process at LNS 102 is finished.

Then, TSATC 13 of LAC 101 searches the tunnel administration table backward (144) to find a tunnel, for which the tunnel presence/absence field is 1 (tunnel B) (252).

TSATC 13, when it decides that the tunnel ID of tunnel B is greater than the tunnel ID of session A (253), searches the session administration table backward (146) and finds session B, for which the session presence/absence field is 1 (254).

After this, TSC 11 of LAC 101 transmits a CCRQ (Change Call Request) defined as a session switchover control message. The CCRQ message is added with information about a session on which a session switchover is carried out and information about a session as the destination of switchover. More specifically, the CCRQ is added with an AVP specifying a session ID of session B and its tunnel ID to indicate a session on which switchover is carried out and an AVP specifying a session ID of session A and the tunnel ID where the session A existed to indicate the destination of switchover (255).

TSC 11' of LNS 102 that received the CCRQ directs TSATC 13' to rewrite the record of the session A shown in AVP with the record of the session B shown in AVP. In response to the command, TSATC 13' rewrites the tunnel administration table and the session administration table. After this, TSC 11' transmits a CCRP (Change Call Reply) message to LAC 101.

TSC 11 of LAC that received the CCRP message (256) directs TSATC 13 to rewrite the record of the session A shown in AVP with the record of the session B on the session administration table. By abiding by the command, TSATC 13 rewrites the tunnel administration table and the session administration table. Subsequently, TSC 11 transmits a CCCN (Change Call Connected) message to LNS 102 (257), with which the tunnel-switchover process for a session is completed (258).

Meanwhile, if TSC 11 decides at Step 253 that the tunnel ID of the session A is equal to or greater than the tunnel ID of the session B, it is not necessary to switch over the session B, so that TSC 11 terminates the process.

Or, if TSC 11 decides at Step 254 that the tunnel B is empty, having no session established, then goes back to Step 252 and searches again for a tunnel for which the tunnel presence/absence field is 1.

In the present embodiment, the communication system, in which a tunnel is formed along the physical line and a plurality of sessions are multiplexed on this line, offers service of reserving sessions in a smaller number of tunnels in exchange for a specified service fee. Under this service system, while the user pays a specified service fee, the fee charged according to the number of tunnels or the number of physical communication lines is made smaller for the user. On the other hand, the service provider can charge a specified service fee as the basic charge, which is steady revenue. Thus, there are merits both for the user and the service provider.

(3) Second Tunnel Control Method Taking SL (Service Level) into Consideration

In the first control method, description has been made of the tunnel control method in such a case as the same level of service is provided for all remote users. However, the present invention is not limited to this form of service, but its technical philosophy can be applied to cases where bandwidth control is performed according to the contracted service level of each user. Description will now be made of a tunnel control method with service level of each user taken into consideration.

Figure 9:
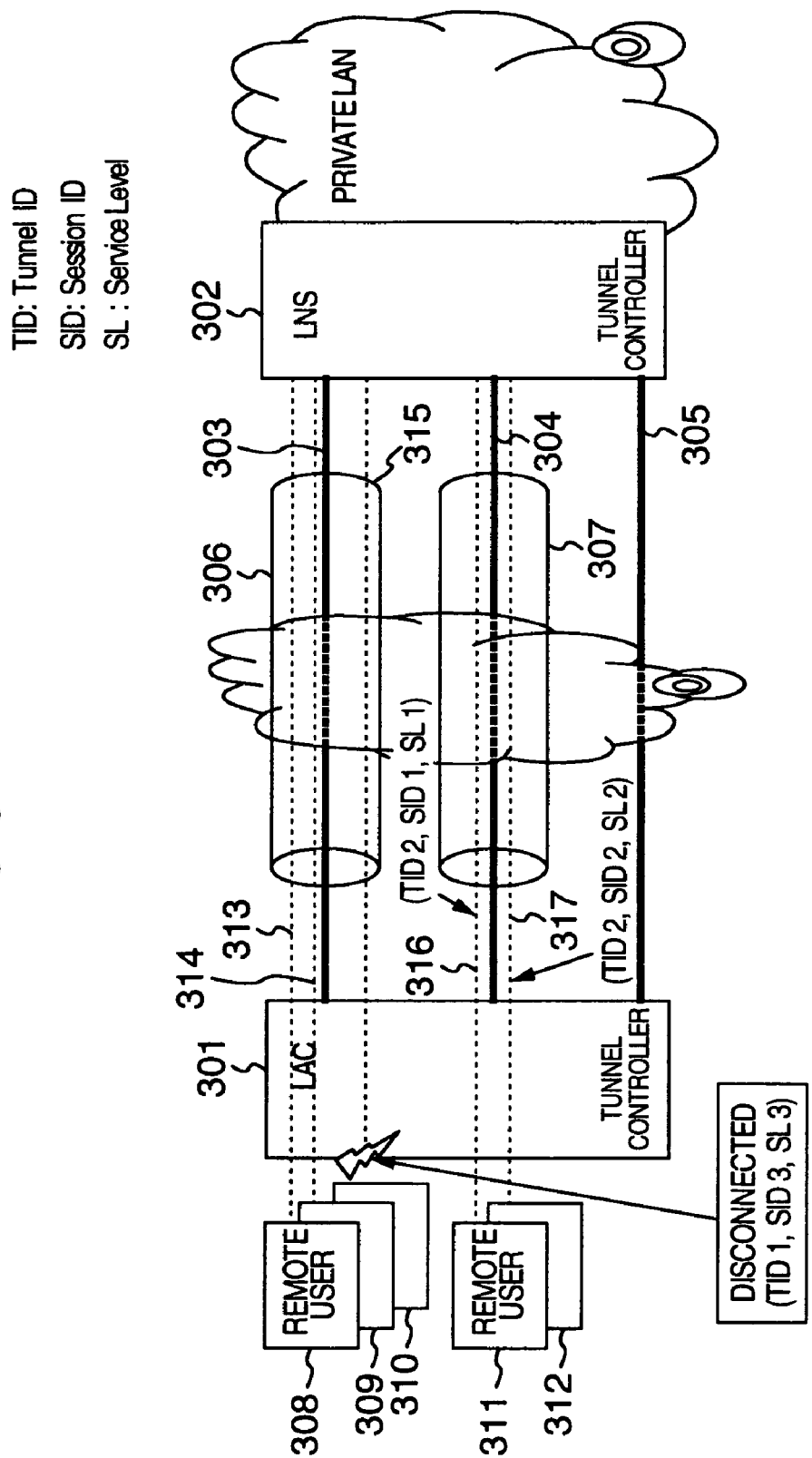
FIG. 9 shows a configuration of a network to which a second tunnel control method is applied.

FIG. 9 shows an example of tunneling control of the tunnel controllers according to the present embodiment. In FIG. 9, a VPN is formed using L2TP tunnels between those tunnel controllers LAC 301 and LNS 302, and a plurality of remote users communicate with a private LAN through the VPN.

LAC 301 and LNS 302 are interconnected by communication lines 303 and 304 respectively through public-network-side line connection interfaces 7, 8. In the communication lines 303 and 304, tunnels 306 and 307 are established, the tunnel ID of the tunnel 306 is 1 and the tunnel ID of the tunnel 307 is 2. In this example, one tunnel is established on each communication line.

Let us suppose that the limit of sessions multiplexed in a tunnel is decided by the total value of SL (service level) allocated to the respective sessions in the tunnel. If the maximum value of SL that can be provided in the multiplexed sessions in a tunnel with a tunnel ID k is denoted by nk, the SL 1 allocable to a user is expressed as follows:

$$1 \leq 1 \leq n_k$$

The remote users 308, 309 and 310 have communication established through sessions 313, 314 and 315 and as (session ID, SL), (1,1), (2,1) and (3,3) are allocated to the sessions 313, 314 and 315 in that order. In FIG. 9, sessions can be multiplexed in each tunnel up to the maximum SL value of nk=5. In this case, the total value of SL in the tunnel 306 already amounts to 5, it is impossible to add any more session. If the transmission speed is f bits/s, the lowest transmission speeds guaranteed to the remote users 308, 309 and 310 are f/5, f/5 and 3×f/5, respectively. In the tunnel 7, the remote users 311, 312 have sessions 316, 317 established respectively, and their (session ID, SL) is (1,2) and (2,1) in this order.

Figure 10:
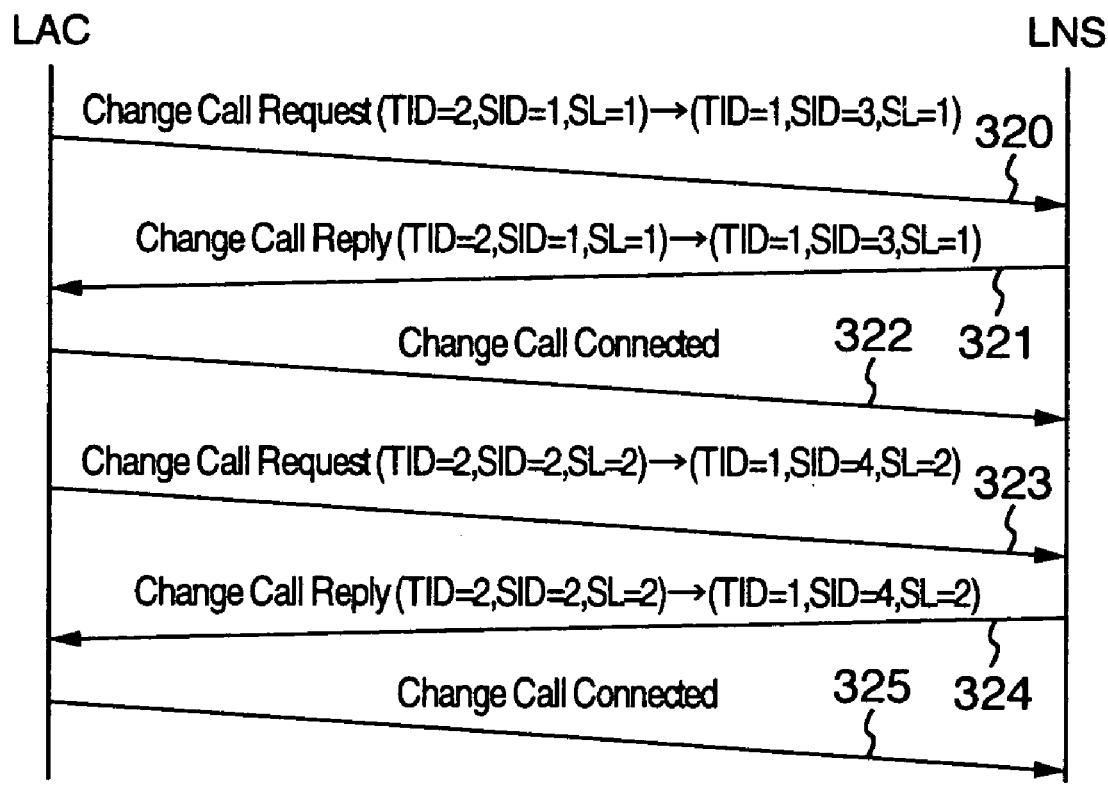
FIG. 10 shows a signal sequence of the second tunnel control method.

Suppose that under the condition shown in FIG. 9, the remote user 310 finished communication and the session 315 was disconnected. At this time, L2TP processor 9 of LAC 301, in which the tunnel control process takes place, generates a request control message CCRQ (Change Call Request) to switch the session 316 to the tunnel 306 as shown in FIG. 10, and transmits the message to LNS302 (320).

Figure 11:
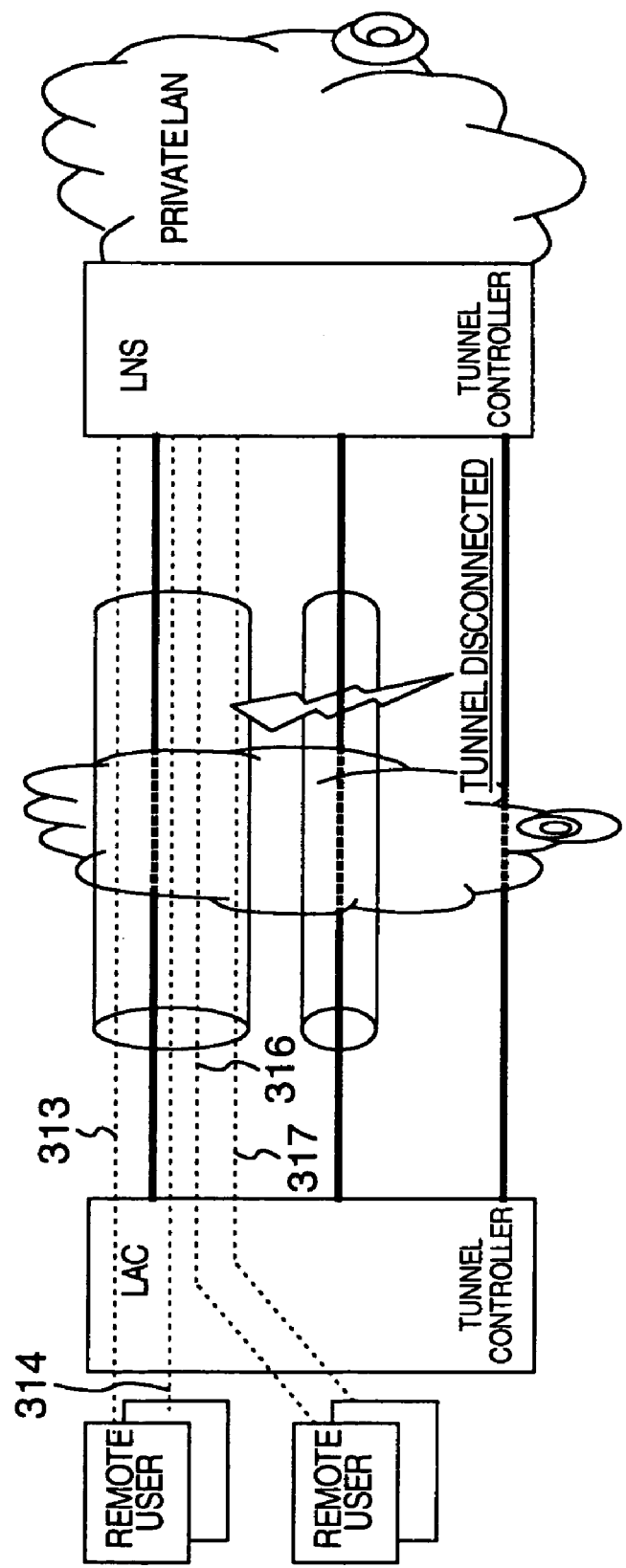
FIG. 11 shows the state after the second tunnel control method has been used.

In response to this message, a similar tunnel control process takes place in L2TP processor 9 of LNS 302, and when permitting the above-mentioned session switchover, the L2TP returns a reply control message CCRP (Call Change Reply) to LAC 301 (321). Finally, LAC 301 sends a switchover complete control message CCCN (Change Call Connected) to LNS 302, with which the session switchover is completed (322). However, because there remains SL value of 2 in the tunnel 306, in the same manner as mentioned above, the session 317 is switched to the tunnel 306 by the control messages (323, 324, 325). Subsequently, the tunnel 307 where there is no session is disconnected. The condition at this stage is shown in FIG. 11.

The control messages exchanged between LAC 301 and LNS 302 are defined anew in the same way as in the first control method. In addition, an AVP for switching SL over is defined.

Figure 12:
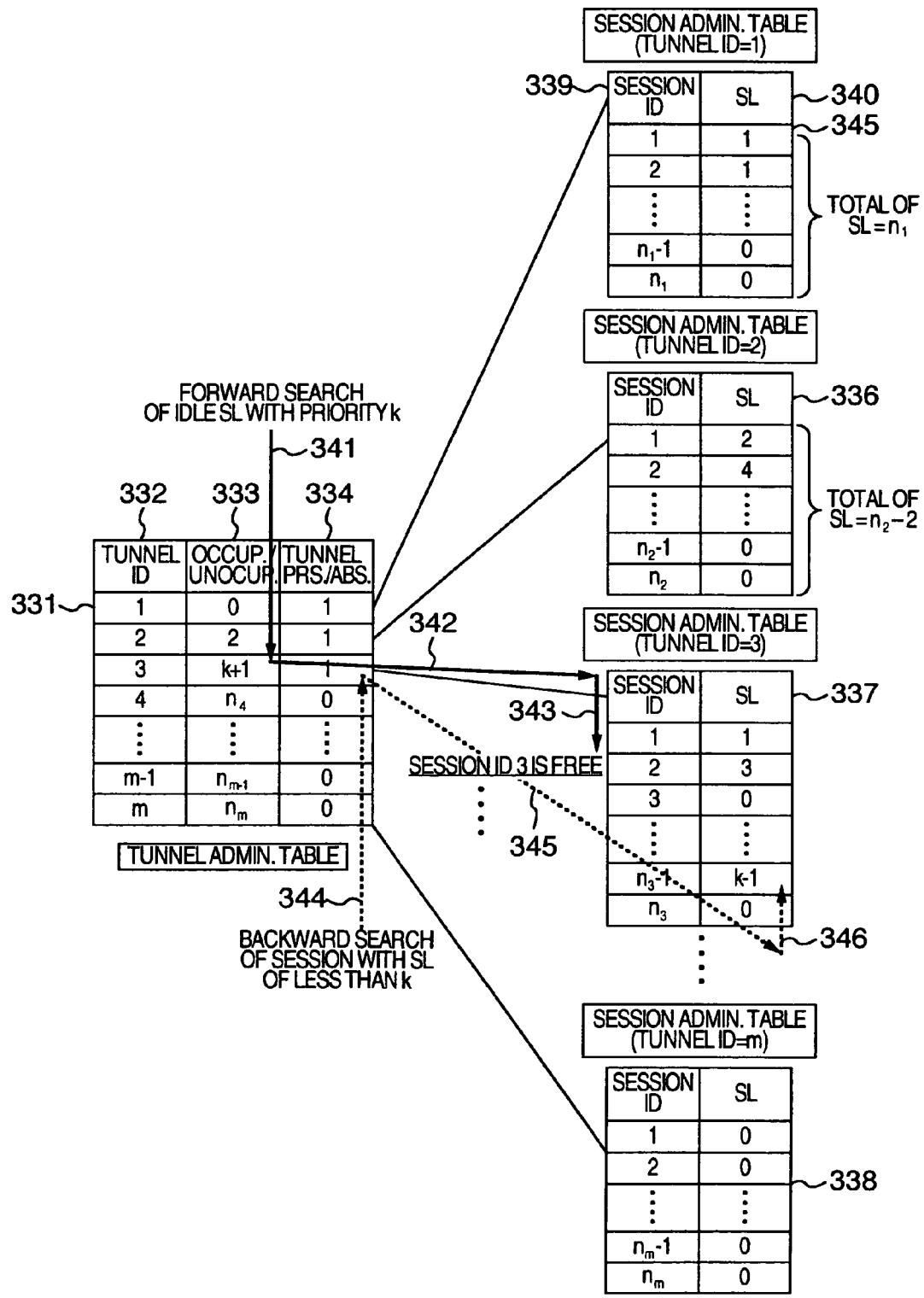
FIG. 12 shows an example of configuration of the tunnel/session administration tables.

TSATC 13 administers information about tunnels and sessions according to the tunnel/session administration tables (FIG. 12) stored in the storage 14 controlled by TSATC 13. In this case, LAC 101 and LNS 102 are connected by m pieces of communication lines, and in a tunnel having a tunnel ID k, the sessions can be multiplexed up to the total SL value of nk. The tunnel administration table 331 contains a tunnel ID field 332, an idle level field 333, and a tunnel presence/absence field 334 to provide information about each tunnel. The tunnel ID field 332 and the tunnel presence/absence field 334 are the same as those in the first tunnel control method. The idle level field 333 shows how many idle levels exist in a tunnel with a possible maximum SL of nk, and the value shown in this field represents the number of idle service levels.

In the session administration tables 335 to 338, there are the session ID field 339 and the SL field 340. The session ID field 339 is the same as that in the first control method. The SL field 340 shows SL allocated to the session of the session ID. In other words, this SL is allocated to the user of the session.

Figure 13:
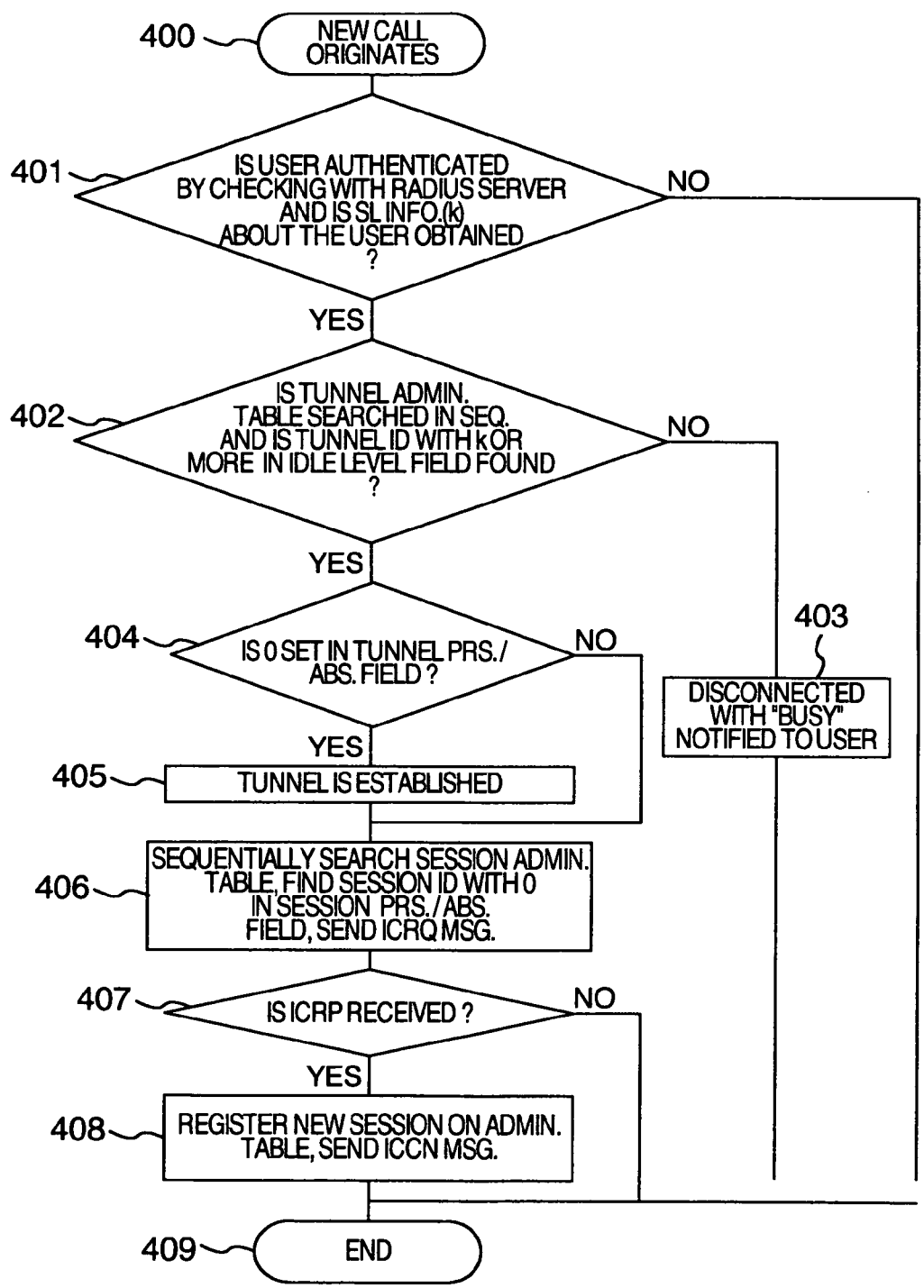
FIG. 13 shows an example of a flowchart for establishing a new session of service level k.

FIG. 13 is a flowchart of the operation in LAC 301 when a call originates from a user having an allocated SL of k and a new session is established.

When a user initiates a call and the call enters the user-side (or the private-LAN-side) line connection interface 5 or 6, the general control unit 1 of LAC 301 detects it. Then, in response to a command from the general control unit 1, the user information administration unit 4 performs user authentication by RADIUS server. After authentication by RADIUS is over, the user information administration unit 4 receives SL (k) information about the user from the RADIUS server, and writes the information in the user information administration/storage unit 10 (401). L2TP processor 9 takes over the subsequent tunnel control process.

TSC 11 instructs TSATC 13 to sequentially search the tunnel administration table to find a tunnel with idle SL of k or more. In response to the instruction, TSATC 13 looks for a tunnel with idle SL of k or more (341, 402). If the tunnel found has not been established (404), to form a tunnel on the corresponding communication line, TSC 11 transmits an SCCRQ message to LNS 302.

In response to the SCCRQ message, TSC 11' of LNS 302 directs TSATC 13' to write 1 in the tunnel presence/absence field on the tunnel administration table for the tunnel corresponding to the communication line by which the SCCRQ message was received. By abiding by this command, TSATC 13' rewrites the tunnel administration table. Subsequently, TSC 11' transmits a SCCRP message to LAC 301.

TSC 11 of LAC 301 that received the SCCRP directs TSATC 13 to write 1 in the tunnel presence/absence field on the tunnel administration table for the tunnel corresponding to the communication line through which the SCCRP message was received. In response to this command, TSATC 13 rewrites the tunnel administration table. TSC 11 transmits an SCCCN message to LNS 302 to establish the tunnel (405).

Then, TSC 11 of LAC 301 directs TSATC 13 to sequentially searches the session administration table of the session ID, which was detected at Step 402, to find an unused session ID, for which the SL field is 0. Abiding by this command, TSATC 13 searches for an unused session ID (343). To notify a searched-out unused session ID, TSC 11 transmits to LNS 302 on the opposite side, an ICRQ message in which the session ID of an unused session is specified in an Assigned Session ID AVP and k is specified in Assigned Service Level AVP. The Assigned Service Level AVP is a newly defined AVP exchanged between LAC and LNS to show SL assigned to the session (406).

The TSC 11 of LNS 102 that received the ICRQ message directs TSATC 13' to access the session administration table of the tunnel through which the ICRQ message was received and write a value shown in Assigned Service Level ID to the SL field of the session specified in Assigned Session ID AVP oh the ICRQ message, and also directs TSATC 13' to subtract the value of Assigned Service Level from the value of the idle level field on the tunnel administration table. In response to this command, TSATC 131 rewrites the tunnel administration table and the session administration table in the storage 14'. After this, TSC 11' transmits an ICRP message to LAC 301. At this time, the Assigned Session ID AVP, which is attached to the ICRP message, has the same session ID as specified by LAC 301.

The TSC 11 of LAC 301 that received the ICRP message (407) directs TSATC 13 to rewrite with k the previous value in the SL field of the session ID detected at Step 343 and also directs TSATC 13 to subtract k from the idle level field on the tunnel administration table. In response to this command, TSATC 13 rewrites the tunnel administration table and the session administration table in the storage 14, and TSC 11 transmits an ICCN message to LNS 102 to establish the session (408).

Figure 14:
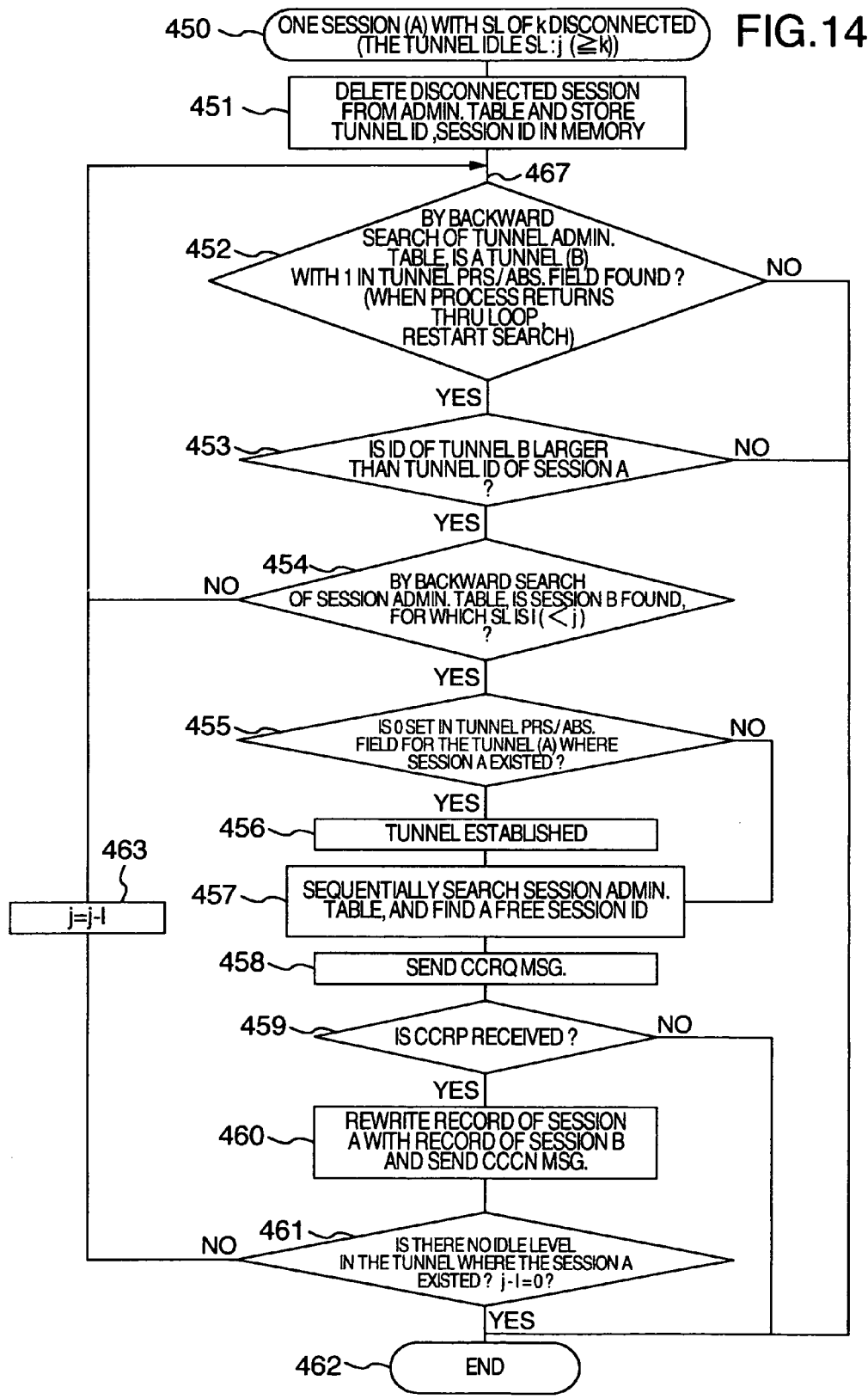
FIG. 14 shows an example of a flowchart when the session of service level k was disconnected.

FIG. 14 is a flowchart of the operation in LAC 301 when the session A with SL=k has been disconnected and there is idle SL of j (≧k) in the tunnel A where the session A existed. This operation will be described with reference to FIG. 14.

When detecting the disconnection of the session A with SL=k in the tunnel A (450), TSC11 of LAC 301 stores the tunnel ID, session ID and SL(=k) of the session A in the storage 14. TSC 11 causes TSATC 13 to write 0 in the SL field of the session A on the session administration table and add k to the value of the idle level field of the tunnel, in which the session existed, on the tunnel administration table (451). Similarly, in LNS 302, when detecting the disconnection of the session A, TSC 11' directs TSATC 13' to write 0 in the SL field of the session A on the session administration table and add k to the value idle level field of the tunnel, in which the session A existed, on the tunnel administration table. In response to this command, TSATC 13' rewrites the tunnel administration table and the session administration table in the storage 14'. The operation in LAC 301 is terminated for a time.

After this, TSC 11 causes TSATC 13 to search the tunnel administration table backward to find a tunnel B, for which the tunnel presence/absence field is 1 (344, 452). TSC 11, when it compares the tunnel IDs of the tunnel B and the tunnel A and decides that the ID of the tunnel B is greater than that of the tunnel A (453), searches the session administration table of the tunnel B backward to find a session B, for which the SL field is 1 ($\leq k$) (346, 454).

When TSC 11 detects that the tunnel A was disconnected in addition to the disconnection of the session A (455), TSC 11 establishes the tunnel A again (456). After this, TSC 11 sequentially searches the session administration table of the tunnel A, finds an unused session ID (343, 457), and transmits a CCRQ (Change Call Request) message. At this time, the message is added with an AVP showing the tunnel ID, the session ID (the session to be switched) and SL (Assigned Service Level) of the session B and also an AVP showing the tunnel ID where the session existed), the session ID (the destination session of switchover) and SL of the session A (358).

TSC 11' of LNS 102 that received the CCRQ directs TSATC 13' to rewrite the record of the session A shown in AVP with the record of the session B shown in AVP, add the value (k) shown in Assigned Service Level AVP to the idle level field of the tunnel where the session B existed on the tunnel administration table, and subtract k from the idle level field of the tunnel where the session A existed. By abiding by the command, TSATC 13' rewrites the tunnel administration table and the session administration table. After this, TSC 11' transmits a CCRP (Change Call Reply) message to LAC 301.

TSC 11 of LAC 101 that received the CCRP message (456) directs TSATC 13 to write the record of the session A shown in AVP with the record of the session B on the session administration table. By abiding by the command, TSATC 13 rewrites the tunnel administration table and the session administration table, add k to the value of the idle level field of the tunnel, in the session B existed, on the tunnel administration table, and subtracts k from the idle level field of the tunnel, in which the session A existed. In response to this command, TSATC 13 rewrites the tunnel administration table and the session administration table. Subsequently, TSC 11 transmits a CCCN (Change Call Connected) message to LNS 302 to thereby complete the switchover of sessions (460).

TSC 11 decides whether there is not any idle level, in other words, j−1=0 in the tunnel A (461), and if there is not any idle level, completes the process (462), and if there is, substitutes j−1 for j (463), and repeats the process from Step 452.

(4) Third Tunnel Control Method—SL (Service Level) Variable Type

Suppose that communication is taking place under the condition shown in FIG. 9. The remote user 310 to whom SL=3 is allocated and who hardly communicate through the session 315 is consuming part of the bandwidth of the tunnel 306.

As a solution to this problem, when a user makes a call, SL suitable for an amount of communication on each occasion is allocated to the session within the range of SL contracted to the user.

By allocating the maximum SL (contracted SL) at the start of a session, and monitoring the service condition through the bandwidth control unit 12, TSC 11 reduces the allocated SL to a level adequate to the actual amount of communication detected. Subsequently, when packet abandonment has come to occur repeatedly in the bandwidth control unit 12 due to an increase in the amount of communication, the maximum SL is allocated once again. At this time, there is a possibility that session switchover occurs. Afterwards, as in the same way as before, SL is decreased to a suitable level.

Figure 15:
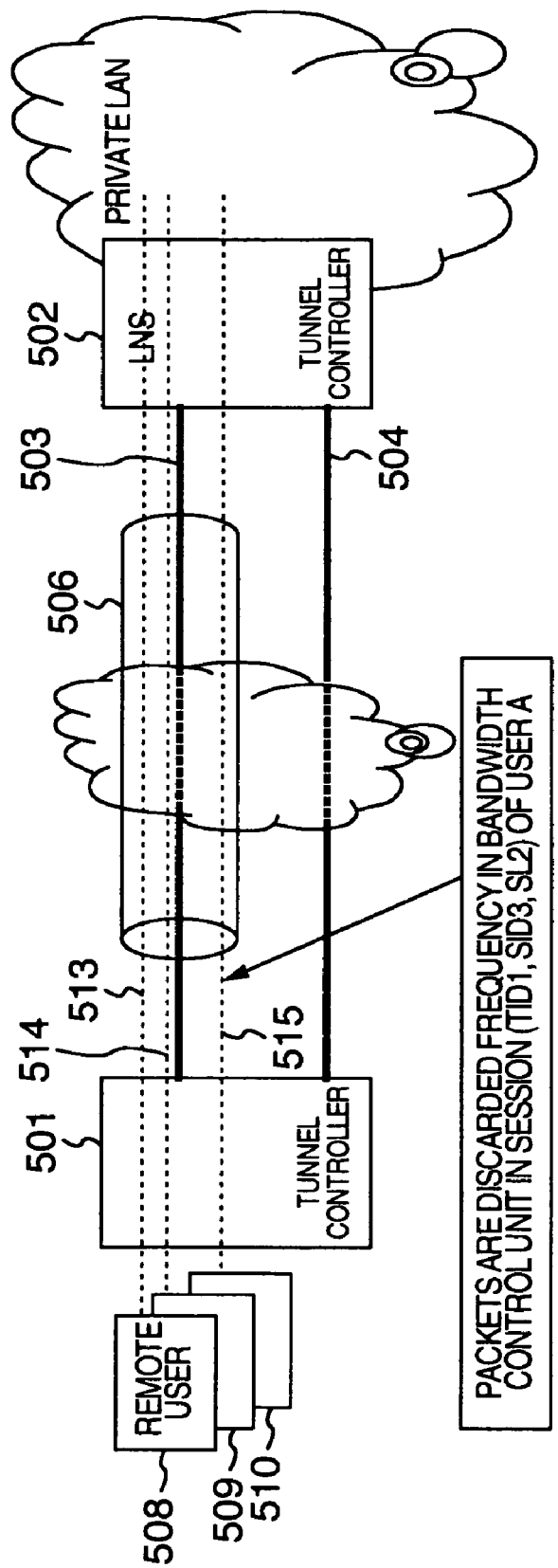
FIG. 15 shows a network configuration to which a third tunnel control method is applied.

FIG. 15 shows an example of tunnel control by the tunnel controller according to the present invention.

In FIG. 15, a plurality of remote users communicate data with a private LAN through the tunnel controllers LAC 501 and LNS 502. LAC 501 and LNS 502 are interconnected by a plurality of physical communication lines, on which lines L2TP tunnels are formed.

The communication lines 503, 504 are connected to the public-network-side line connection interfaces 7, 8 of LAC 501. On the other hand, the communication lines 503, 504 are also connected to the public-network-side interfaces 7, 8 of LNS 502. Thus, two physical lines connect LAC 501 and LNS 502. A tunnel 506 is established on the communication line 503, and the tunnel ID is 1. In this example, it is assumed that one tunnel is established on one communication line and sessions can be multiplexed up to the maximum value 5 of SL.

The remote users 508, 509, 510 have the sessions 513, 514, and 515 established in the tunnel 506, and (session ID, SL) of those sessions is (1,1), (2,1) and (3,2) in that order. Suppose that the contracted SL of the remote users 513, 514, and 515 is 1, 1, and 5, respectively. The contracted SL for the remote user 510 is 5. To sum up, the situation is that though the remote user 510 has a contracted SL of 5, due to his amount of communication being small, his allocated SL was reduced to 2 by bandwidth adjustment according to monitoring data that was fed back.

Under the condition in FIG. 15, if communication packets are abandoned frequently in the session 515 by the bandwidth control unit 12 of LAC 501 (LNS 502), TSC 11 is going to raise SL of the session 515 to 5 (contracted SL for the remote user 510). However, because there is not such a large idle service level as SL=5 in the tunnel 506, a new tunnel 507 (tunnel ID 2) is established on the line 504 (520, 521, 522) and the session 515 is switched to the tunnel 507 and SL=5 is assigned to the session 515 (523, 524, 525).

Figure 16:
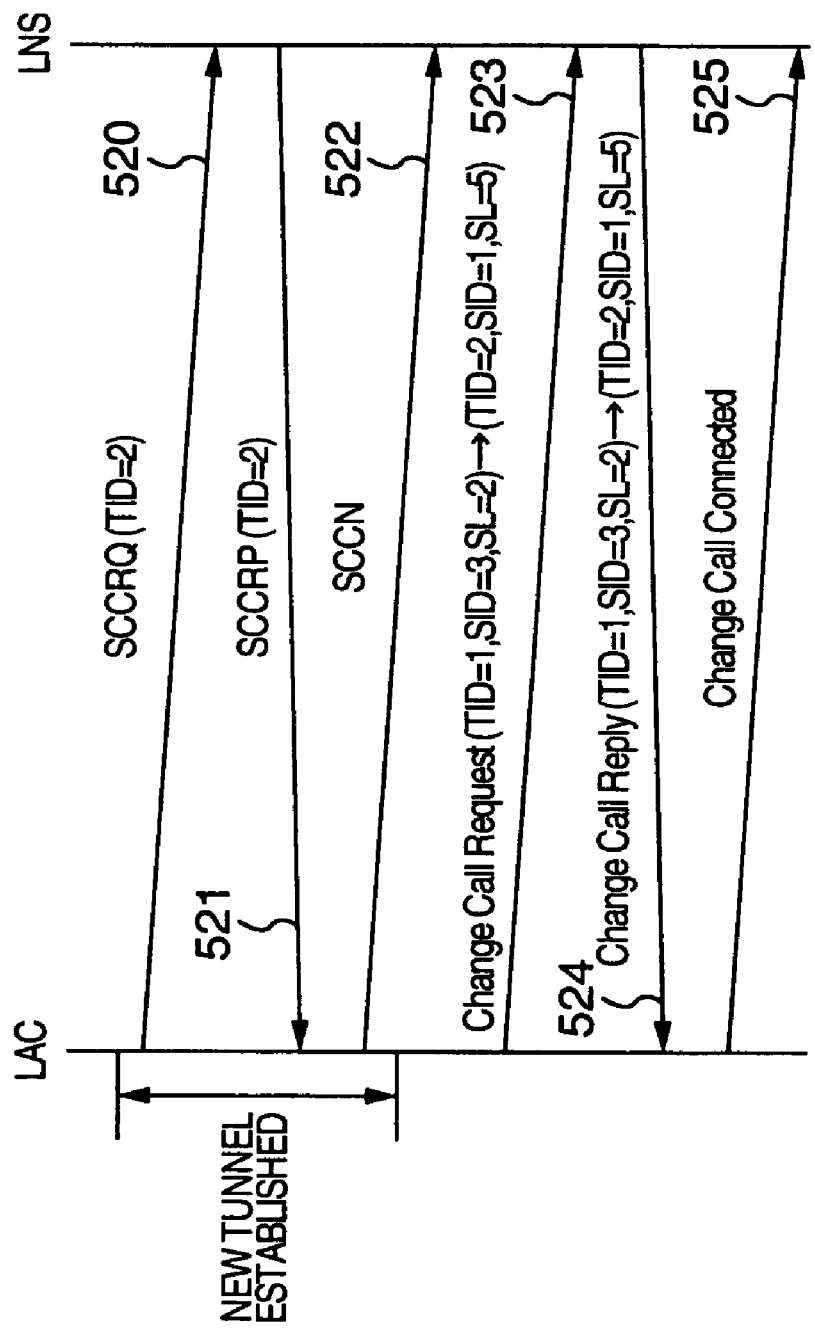
FIG. 16 shows a signal sequence of the third tunnel control method.
Figure 17:
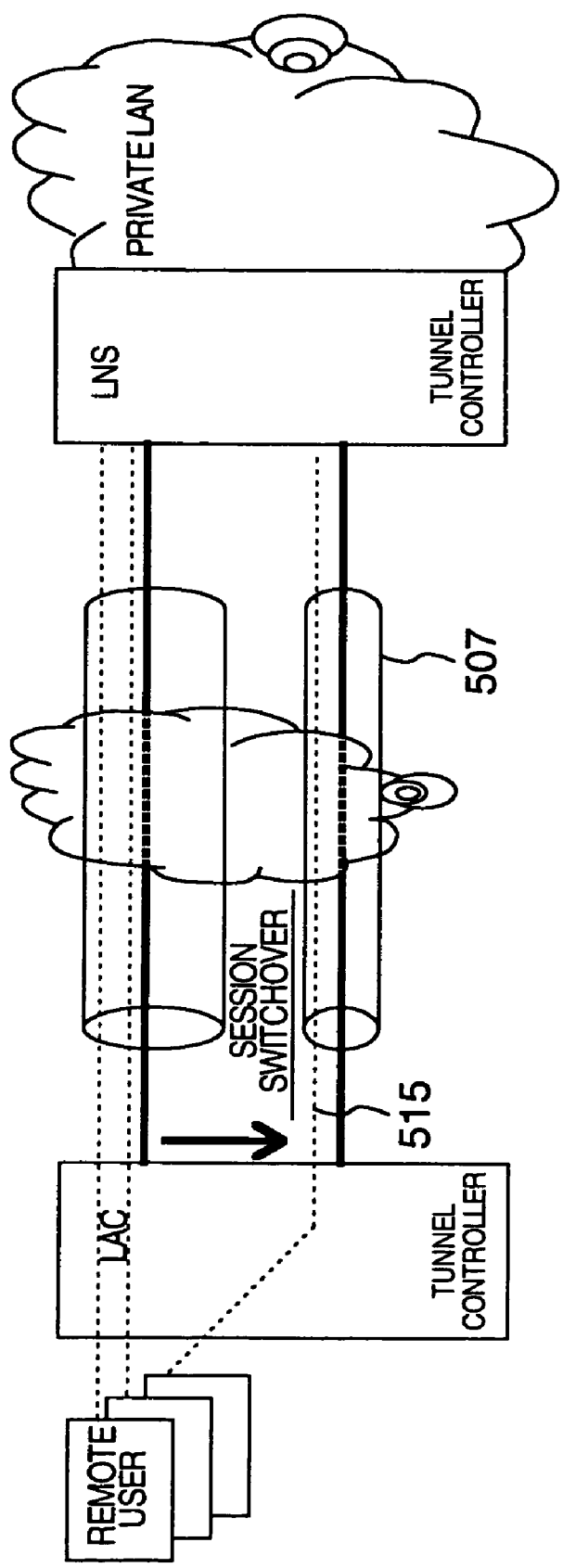
FIG. 17 shows the state after the third tunnel control method was used.

The condition at this time is shown in FIG. 16. The bandwidth control unit 12, by feedback of the state of communication, reduces SL to a suitable level.

When changing SL, as indicated by (523, 524, 525) in FIG. 16, LAC-LNS TSCs exchange information only about SL between by using the control messages, Change Call Request, Change Call Reply and Change Call Connected, and switch over SL of sessions between different tunnels.

Figure 18:
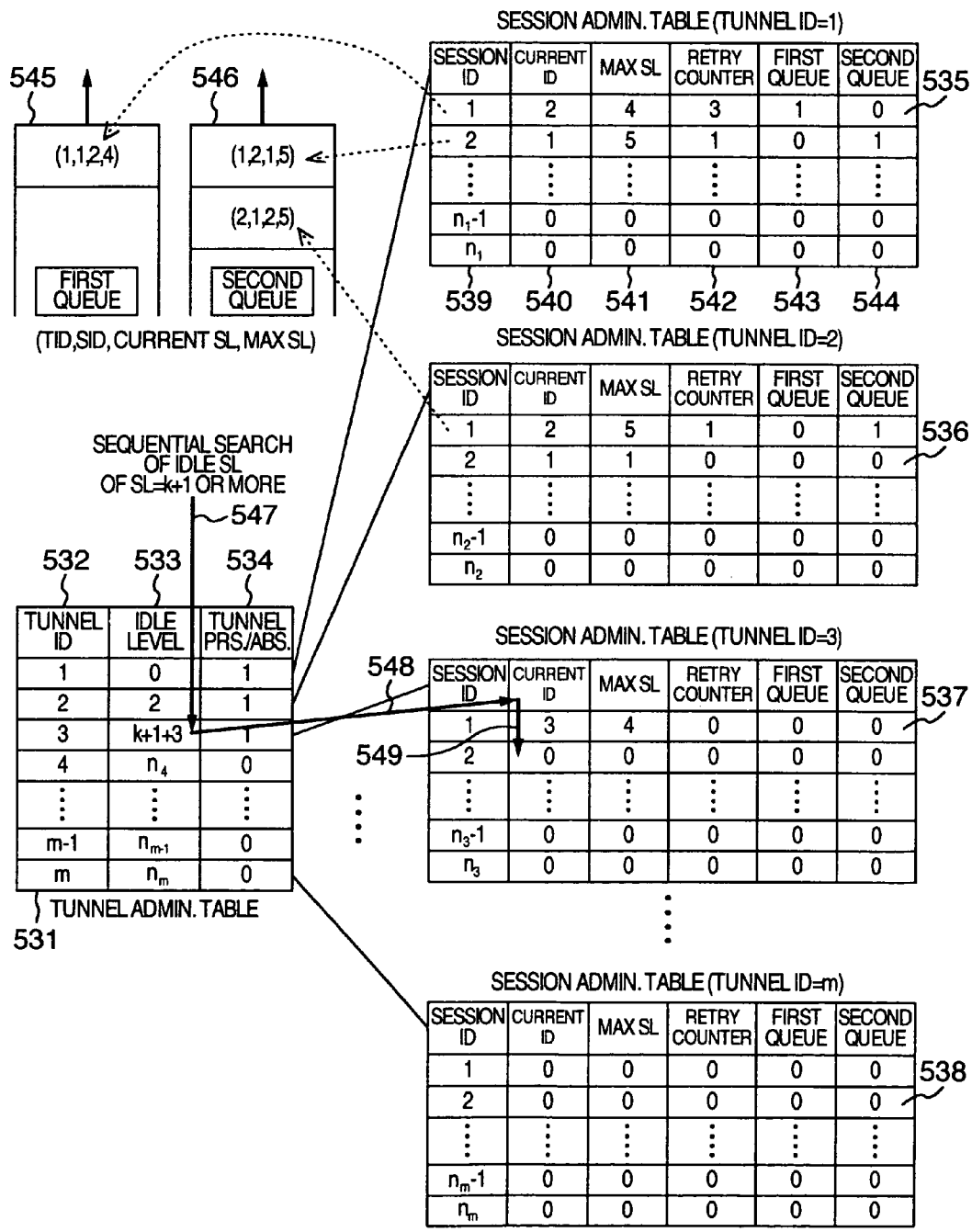
FIG. 18 shows tunnel/session administration tables.

Information about tunnels and sessions is administered by TSATC 13 according to the tunnel/session administration tables in FIG. 18 built on the storage 14. TSCs 11 control their subordinate TSATCs 13 according to the above-mentioned control messages.

It is assumed here that LAC 501 and LNS 502 are connected by m communication lines and sessions can be multiplexed up to the SL total of nk in the tunnel with a tunnel ID k. The tunnel administration table 531 is substantially the same as that used in the second control method.

The session administration tables 535 to 538 each include a session ID field 539, a current SL (service level) field 540, a maximum SL field 541, a retry counter field 542, a first queue field 543, and a second queue field 544.

The session ID field 539 is substantially the same as that in the second control method. The current SL field 540 shows SL actually allocated to the session of a session ID. The maximum SL field 540 indicates the maximum SL allocable to the session of that session ID. It represents SL contracted to the user using that session. The retry counter field increments when the maximum SL cannot be allocated because idle SL is not enough even though the session requests that SL be raised.

On the storage 14, the first queue 545 and the second queue 546 are provided on the storage 14 as queues for sessions waiting for SL allocations. If packets are abandoned frequently due to bandwidth shortage in a session, a set of values representing the tunnel ID, the session ID, the current SL and the maximum SL of the session is placed into the first queue 545. In LAC 501 (LNS 502), SL switchover is carried out starting with the top session in the first queue. For a session that has requested the maximum SL several times and placed into the first queue but the retry counter has run up to higher than a certain value (i) because of SL shortage, a set of values representing the tunnel ID, the session ID, the current SL and the maximum SL is placed into the second queue 546. When a session engaged in communication is disconnected, priority of SL allocation is given to sessions in the second queue 546. In the session administration tables 535 to 538, on the other hand, the first queue field 543 or the second queue field 544 show whether or not the session is placed in the first queue 545 or the second queue 546. When the number is 1, this means that the session is in the queue waiting for SL allocation and when the number is 0, this means that the session is not placed in the queue.

When a session has been disconnected, entries of the disconnected session in the session administration tables are all cleared.

Figure 19:
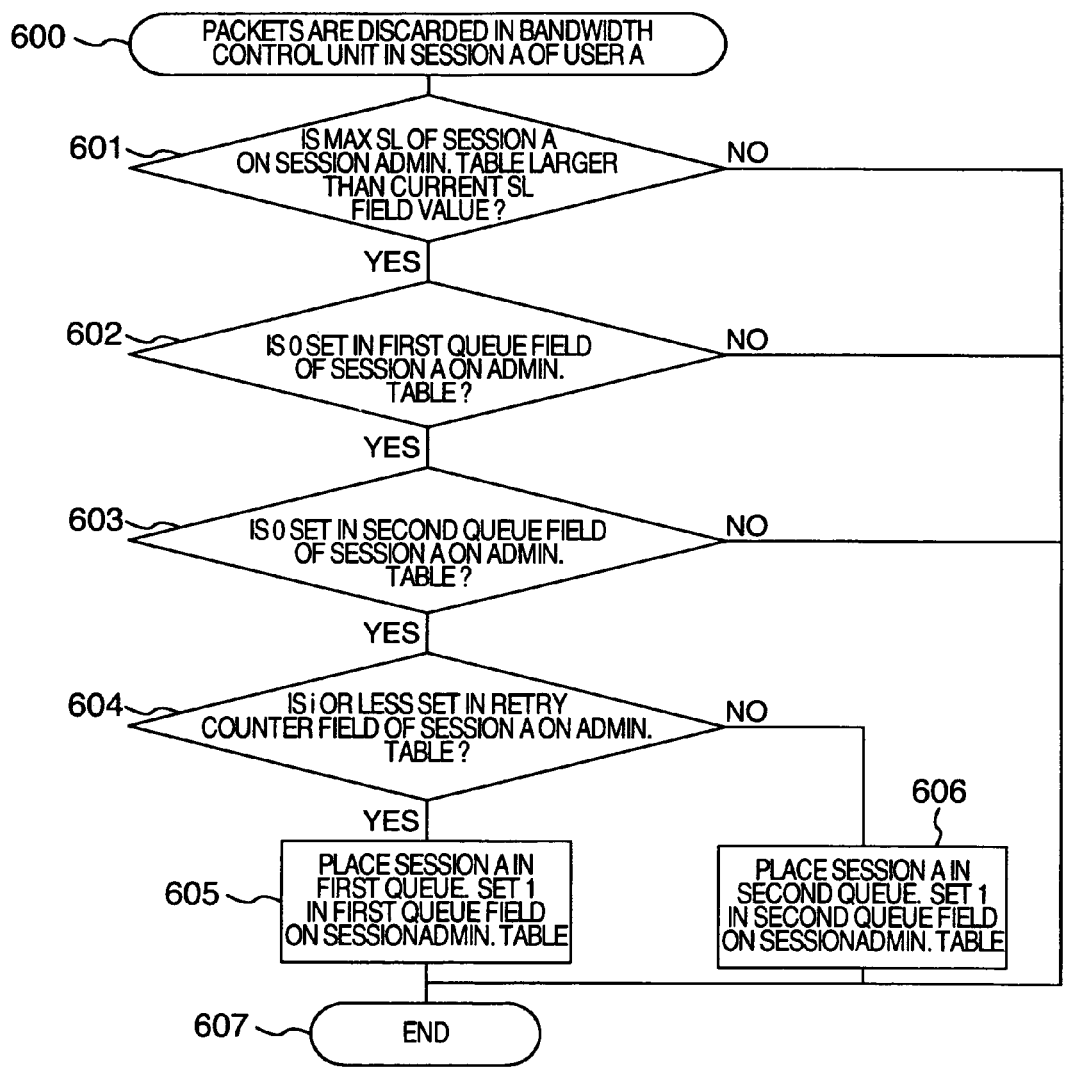
FIG. 19 is a flowchart when packets were abandoned frequently in a session of service level k.

FIG. 19 is a flowchart of the operation in LAC 501 (LNS 502) when packets were abandoned frequently in the session (session A: current SL=k) of a user (contracted SL=k+l, k>0, l>0).

In the bandwidth control unit 12 of LAC 501, when packets of the session A of a user A were abandoned frequently, this is notified to TSC 11 of LAC 501 (600). TSC 11, which was notified of abandonment of packets, requests TSATC 13 to read SL allocated to the session A and the contents of the first queue field 543 and the second queue field 544 on the session administration tables 535 to 538. TSATC 13 reads SL allocated to the session A and the contents of the first queue field 543 and the second queue field 544 on the session administration tables 535 and 538 from the storage 14, and notify to TSC 11. TSC 11 makes sure that SL currently allocated to the session A is not the maximum SL (601) and that 0 is stored in the first queue field 543 of the session administration tables 535 to 538, and also confirms that 0 is stored in the second queue field (603), and decides that the session A is not placed either in the first queue or the second queue. Then, TSC 11 places the session A in the first queue (605) when the retry counter field 542 is not higher than the threshold value i (604), or places the session A in the second queue when the retry counter field 542 is greater than i (606).

Figure 20:
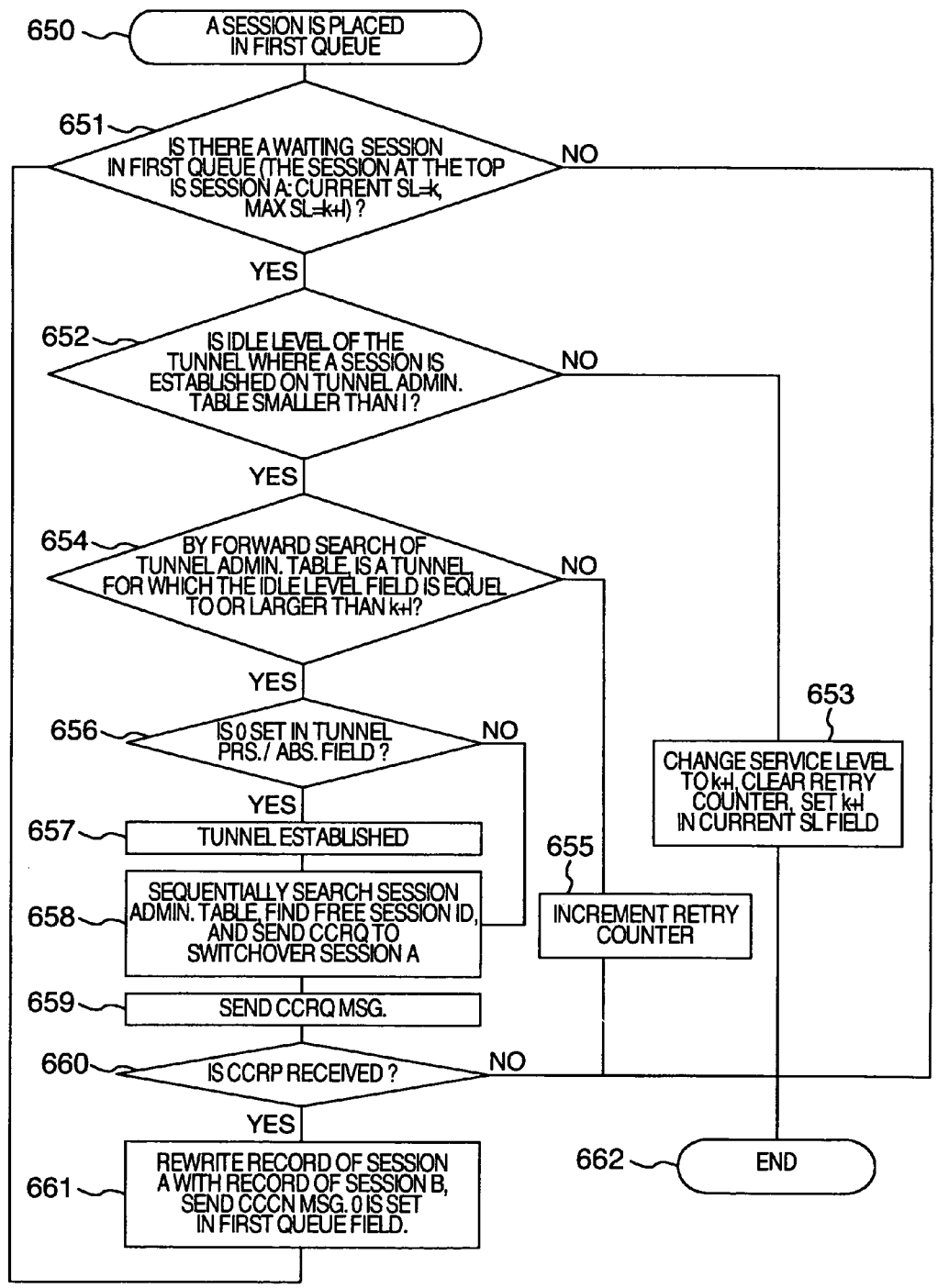
FIG. 20 is a flowchart when a session was placed in the first queue.

FIG. 20 is a flowchart of the operation in LAC 501 when a session is placed in the first queue.

When a session is placed in the first queue (650), TSC 11 directs TSATC 13 to check the top session (session A: current SL=k, maximum SL=k+1) in the first queue (651), and if there is 1 or more idle SL in the tunnel (tunnel A) where the session A is currently established (652), TSC 11 of LAC 501 exchanges control messages with the counterpart of LNS 502, allocates the maximum SL to the session A on the tunnel A, and updates the session administration table (653).

If the idle SL is smaller than 1 at Step 652, a tunnel with idle SL of k+1 or more is searched out (547, 654) and sessions are switched over by Steps 656, 657, 658, 659, 660 and 661 in the same manner as in the second control method. If a tunnel with idle SL of k+1 or more could not be found at Step 654, the value in the retry counter field regarding the session A is incremented (655), with which the process is completed (660). The process moves from Step 661 to Step 651 in anticipation of any session waiting for idle SL having being placed in the first queue during the previous process.

Figure 21:
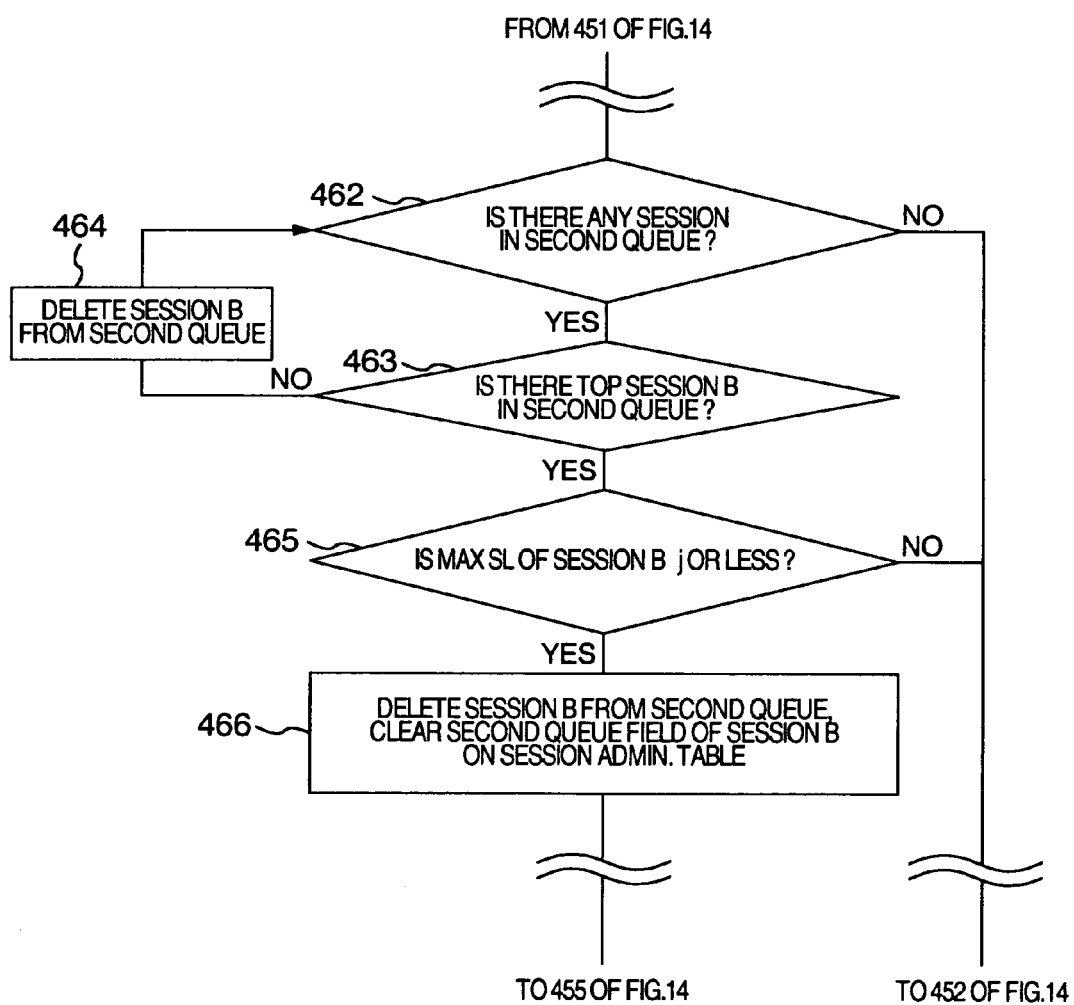
FIG. 21 is a flowchart when the session of service level k was disconnected.

FIG. 21 is a part of the flowchart in LAC 501 when the session A with current SL of k was disconnected. FIG. 21 shows only portion added to the place of Step 457 of the flowchart in FIG. 14.

In the third control method, steps in FIG. 21 are added to the place of Step 457 of FIG. 14 showing the second control method when a session was disconnected, so that priority is given to the session placed in the second queue in execution of session switchover.

When the session A with SL=k which had been established in the tunnel A was disconnected (450), TSC 11 causes TSATC 13 to the tunnel ID, the session ID and the current SL are stored in the storage 14 and write 0 in the SL field regarding the session A on the session administration table (451). When the second queue is checked to see if there is any session in the second queue (462), and if the second queue is found empty, the process proceeds to Step 452. If the second queue is not empty, the session administration tables 535 and so on are checked to see if the session B at the top of the second queue has not already been disconnected, in other words, to see if the current SL is not 0 (463). If the session B does not exist any longer, the session B is deleted from the second queue (464) and the process proceeds to Step 462.

If at Step 463 there is the session B and also the maximum SL to be allocated to the session B is not higher than the idle service level j of the tunnel where the disconnected session existed (465), the session B is deleted from the second queue field, and 0 is set in the second queue field regarding the session B on the session administration table, and the process moves on to Step 455 in FIG. 14 to carry out session switchover to allocate the maximum SL of the session B.

Figure 22:
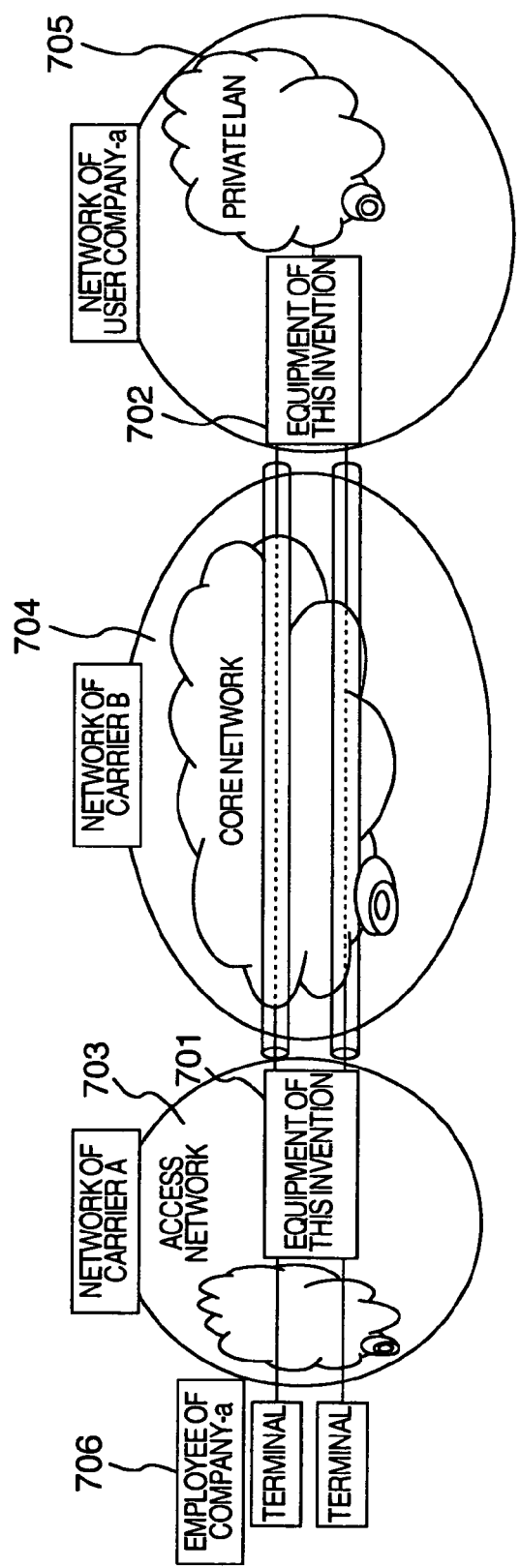
FIG. 22 shows an example in which the tunnel controllers are applied.

FIG. 22 shows an example of a network configuration in a case where a carrier A and a user company a each introduced equipment according to the present invention. The user company is a customer of the carrier A. In this case, in order to build a VPN of the user company a through a carrier B's network, the carrier A uses the third tunnel control method of the equipment according to the present invention and can provide the user company a with various kinds of service. More specifically, by using service level allocation and bandwidth control functions, it is possible to set diverse forms of services to suit the needs of individual employees of the user company a.

FIG. 23 shows an example of network configuration when the user company a introduced the equipment of the present invention to connect private LANs at their bases a and b by VPN connections through carriers A and B and a core network. In this case, too, by using the service allocation and bandwidth control functions, the user company a can perform intricate communication administration. It is also possible to minimize expenses that incur in the use of the networks of the carrier A and the carrier B (they could be of the same carrier) as the access circuits to the public network. For example, when a number of items of VPN tunneling equipment are connected by a plurality of communication lines, the bandwidth control will go a long way toward effective utilization of communication resources while the users are unaware of this fact.

FIG. 24 shows a business model using the present invention of this patent application. More specifically, in FIG. 24, the company A is under contract for service, and USER_A_01 to USER_A_09, the employees of the company A, are using three tunnels, in each of which three sessions are established. Let us consider a case where some users finished the use of tunnels and one user is still using one tunnel. It is assumed the carrier who provides the tunnels charges communication fees on the basis of a fee per tunnel, not per session.

If the company A has not concluded a contract for supplementary service, sessions are not gathered in a fewer tunnels and therefore the company A continues to use the three tunnels and has to pay changes for the three tunnels. Meanwhile, because the tunnels are still leased, the carrier providing the tunnels is unable to provide tunnels for other user companies, and loses potential business chances.

On the other hand, if the company A has concluded a contract for supplementary service, if the present invention of this patent application described above is used, a plurality of sessions can be gathered into a smaller number of tunnels. Consequently, as shown in FIG. 24, the sessions of USER_A_01, USER_A_04 and USER_A_07 can be gathered in one tunnel. In this case, because the company A has only to pay charge for one tunnel, and can save ⅔ of the charge compared with a case where it has not concluded a supplementary service contract. Meanwhile, the carrier providing tunnels can lease two idle tunnels to other business firms, and thus obtain new business chances. Moreover, another merit is that if the carrier collects a sign-up charge as a fixed charge, it can expect to get stable earnings.

As has been described, the business model using the present invention in this patent application provides great merits both for the service provider and the user.

FIG. 25 shows a charging system that realizes the above-mentioned business model. The kernel of the charging system is a charging server 2510. The charging server 2510 includes an input unit 2511 for inputting contract contents, an output unit 2510 for outputting service fee bills to contracting parties and a communication log, a MPU 2513 for controlling the units and devices, an interface 2514 for connecting to LAC unit 101, and a storage 2515 for storing necessary information. The storage stores a contract contents table 2501, an itemized charge table 2503, and a communication log, which are described below.

In the example in FIG. 25, the company A is a contracting party. The company A registers the following items with the carrier when entering into the contract, such as the name of a contractor, a charge-paying bank account, an account and a password of at least one user, whether to use supplementary service or not, and service levels to the contractor or to individual users when using supplementary service. The user for whom a service level has been set is guaranteed of a communication bandwidth corresponding to the service level. This registration is made on the input unit 2511. For example, when a contract is made in writing, the input unit 2511 is a keyboard or a scanner, and contract contents are entered by the carrier. When an electronic registration is made on the Internet, the input unit 2511 is communication equipment for accepting contract contents entered on a mail receiver or on the carrier's home page.

MPU 2513 generates the contract contents table 2501 based on the contents of contracts entered from the input unit 2511, and stores data in the storage. The contract contents table 2501 contains as records such as the contractor, his bank account for payment, and the contents of supplementary service to which the contractor subscribes. In addition, MPU 2513 generates a user administration table based on the contract contents entered from the input unit 2511, such as user ID and a password of each company-A employee using a tunnel and service level (0 when not in use) and the company A from whom the fee is claimed, and stores data in the storage 2515. An arrangement may be made such that the authentication server 2520 contains the user administration table 2502. In this case, MPU 2521 of the authentication server 2520 generates the user administration table and stores data in the storage 2523. The authentication server 2520 is connected with LAC unit 101 and the charging server 2510 through the interface 2520.

On receiving a message that a user has started to use a tunnel from LAC 101 through the interface 2514, MPU 2513 of the charging server 2510 starts to generate a communication log 2504. This communication log is placed in the storage 2515 by MPU 2513. The communication log 2504 keeps communication start dates and times and finish dates and times, communication time obtained from a difference between finish dates and times, user IDs, service levels, communication fees, tunnel names used, etc.

MPU 2513 of the charging server 2510 receives from LAC 101 a report on the service condition of tunnels and sessions, communication time, and also about sessions having been gathered in a fewer tunnels and has those data reflected in the log. Replacing of sessions is important information particularly in charging fees per tunnel. More specifically, MPU 2513 calculates communication fees by multiplying a tunnel charge per unit time by the number of tunnels used by the company A, not by the number of sessions.

MPU 2513 of the charging server 2510 generates an itemized fee table when a fee collection date arrives. More specifically, MPU 2513 records on the itemized fee table, the service basic fee Fa, supplementary fee P when the supplementary service use state flag is 1 on the contract contents table 2501, the communication fee sum Ca obtained by referring to the communication log 2504, and the total Ta of those fees.

Finally, MPU 2513 outputs from the output unit 2512 data of the communication log 2504 and the itemized fee table 2503 by properly selecting the contents. If the addresses of bills are stored in the contract contents table 2501, the addresses are output to facilitate mailing. If e-mail addresses are recorded as bill destinations in the contract contents table 2501, the contents of the communication log 2504 and the itemized fee table 2503 may be sent by e-mail.

The supplementary service fee may be classified as a fixed charge or as a meter rate that increases as the usage rate increases, or it may be included in the communication fee.

What is claimed is:

1. A communication system having tunnels formed on a physical communication line and having a plurality of sessions in each tunnel, comprising:

an authentication unit which authenticates a user using a plurality of said tunnels to determine if said user is a customer of a service of reserving sessions in a smaller number of tunnels in exchange for a specified service fee;

a decision unit for, when said user is authenticated as a customer of said service by said authentication unit, monitoring the state of use of tunnels and sessions used by said user and deciding whether or not the sessions currently used by said user can be reserved in fewer tunnels;

a tunnel control unit which controls the tunnels such that a plurality of sessions used by said user are gathered in a specified tunnel when said decision unit decides that said sessions can be reserved in fewer tunnels; and a charging unit which charges usage fees according to the number of tunnels or the number of physical communication lines.

2. A communication system comprising:

a first server for accommodating user terminals; and a second server, connected through a first network with said first server, for forming a tunnel in said first network in cooperation with said first server and connecting said user terminals to a second network through said tunnel, wherein said first server comprises:

a first interface for connection to said user terminals, an authentication unit for authenticating a user of a terminal requesting to be connected through said first interface, a first tunnel unit for forming, between said first server and said second server, said tunnel to establish a session for said authenticated user, and outputting packets received from said first interface, a second interface for transferring packets output from said first tunnel unit through said tunnel formed on said first network, and a control unit for monitoring said session and controlling said first tunnel unit to reserve said session for said authenticated user in fewer tunnels, and wherein said second server comprises:

a third interface for connection to said first network, a second tunnel unit for forming, between said first server and said second server, said tunnel for establishing a session for said authenticated user, decapsulating encapsulated packets received from said third interface and outputting the decapsulated packets, and a fourth interface for transferring the decapsulated packets output from said second tunnel unit to said second network.

3. A communication system according to claim 2, wherein said control unit determines a tunnel where a session was disconnected out of a plurality of tunnels, and controls said first tunnel unit to shift a session in another tunnel to the tunnel where the session was disconnected session.

4. A communication system according to claim 3, wherein said first server further comprises:

a storage unit for storing an administration table for administrating said tunnels, and wherein said control unit generates said administration table, and administers the establishment of said tunnels and reserving of said sessions according to said administration table.

5. A communication system according to claim 4, wherein said control unit detects disconnection of a session, registers the disconnected session in said administration table, searches said administration table for a session on another tunnel movable to the tunnel where said session was disconnected, and transmits a session switchover message, including identification information of a searched-out session, to said second server, and wherein said second server, in response to said switchover message, moves the session on the other tunnel to the tunnel where said session was disconnected.

6. In a virtual private network, a communication method for transferring packets received by a first communication interface through a second communication interface, said communication method comprising the steps of:

reserving a first logical path on a first physical communication line connected to said second interface;

reserving a first session on said first logical path;

reserving a second logical path on a second physical communication line connected to said second interface;

reserving a second session on said second logical path;

monitoring a bandwidth of said first logical path; and when some spare bandwidth exists on said first logical path determined as a result of said monitoring step, reserving again said second session, which was previously reserved on said second logical path, on said first logical path according to a degree of available bandwidth on said first logical path.

7. A communication method according to claim 6, wherein said step of reserving the first session on said first logical path comprises the steps of:

reading a state of use of said first logical path from a first storage unit where the state of use of said first logical path is stored, deciding whether or not a new session can be reserved on said first logical path based on the state of use, and when the decision is that a new session can be reserved, registering a new session to be reserved in said first storage unit;

wherein said step of reserving the second session on said second logical path comprises:

reading a state of use of said second logical path from a second storage unit where the state of use of said second logical path is stored, deciding from the state of use read whether or not a new session can be reserved on said second logical path; and when the decision is that a new session can be reserved, registering a new session to be reserved in said second storage unit; and wherein said step of monitoring the bandwidth of said first logical path comprises:

reading the state of use of said first logical path from the first storage unit for administrating a service condition of said first logical path, and deciding from the state of use read whether or not a new session can be reserved on said first logical path.

8. A communicating method according to claim 6, further comprising the steps of:

allocating a service level to said session, wherein said step of monitoring the bandwidth of said first logical path monitors a total service level of sessions reserved on said first logical path, and wherein said step of reserving the session, previously reserved on said second logical path, on said first logical path further comprises:

calculating a service level from the total service level of said session and all service levels allocable to said logical path, comparing the service level of the session reserved on said second logical path with the calculated service level, and when, according to a result of said comparing step, the service level of the second logical path reserved on the second physical line is not higher than the calculated service level, reserving the session, previously reserved on said second logical path, on said first logical path.

9. A communication method according to claim 6, wherein said step of reserving the session, previously reserved on said second logical path, on said first logical path comprises the steps of:

reserving a new session on said first logical path, transferring packets, previously transmitted through the session reserved on said second logical path, through a new session reserved on said first logical path, and disconnecting the session reserved on said second logical path.

10. A communication method according to claim 9, further comprising the steps of:
- allocating a service level to said session;
- monitoring the traffic of said session; and
- when the traffic of said session does not match the allocated service level, adjusting the service level of said session to match the traffic.

11. A communication method according to claim 10, wherein said step of adjusting said service level of said session to match the traffic decreases the service level of said session when the traffic of said session is lower than a threshold value, or increases the service level of said session when the traffic of said session is higher than the threshold value.

12. A communication system for building a Virtual Private Network (VPN), comprising:
- a first interface which connects to a user terminal through a network;
- an authenticating unit which authenticates a user requesting a connection through said first interface;
- a tunnel unit which forms a tunnel for establishing sessions for said authenticated user, and encapsulating and outputting packets received from said first interface;
- a second interface which transfers packets, output from said tunnel unit, to another network; and
- a control unit which monitors said sessions, and controls said tunnel unit to reserve sessions in a fewer tunnels.

13. A communication system according to claim 12, wherein said control unit controls said tunnel unit to determine a tunnel where a session was disconnected, out of a plurality of tunnels, and move a session on another tunnel to the tunnel where the session was disconnected.

14. A communication system according to claim 13, further comprising:
- a storage unit for storing an administration table to administer said tunnel,
- wherein said control unit generates said administration table and administers establishment of said tunnel and reservation of said session according to said administration table.

15. A communication system according to claim 14, wherein said control unit detects disconnection of a session, registers the disconnected session in said administration table, searches said administration table for a session on another tunnel likely to be able to be shifted to the tunnel where said session was disconnected, generates a session switchover message, including identification information about the searched-out session, and transmits said session switchover message from said second interface.

16. A computer-readable recording medium for storing a program instructing a computer to execute steps for transferring packets received from a first communication interface through a second communication interface, said steps comprising:
- reserving a first logical path on a first physical line connected to said second interface;
- reserving a first session on said first logical path;
- reserving a second logical path on a second physical path connected to said second interface;
- reserving a second session on said second logical path;
- monitoring the bandwidth of said first logical path; and
- when some spare bandwidth exists on said first logical path determined as a result of said monitoring step, reserving said second session, previously reserved on said second logical path, on said first logical path according to a degree of available bandwidth on said first logical path.

* * * * *